US012570318B1

(12) United States Patent
Bloomquist, Jr.

(10) Patent No.: US 12,570,318 B1
(45) Date of Patent: Mar. 10, 2026

(54) AUTO-CALIBRATION FOR PERSONALIZED SELF-DRIVING EXPERIENCE

(71) Applicant: Ambarella International LP, Santa Clara, CA (US)

(72) Inventor: Robert Dale Bloomquist, Jr., Brighton, MI (US)

(73) Assignee: Ambarella International LP, Santa Clara, CA (US)

( * ) Notice: Subject to any disclaimer, the term of this patent is extended or adjusted under 35 U.S.C. 154(b) by 72 days.

(21) Appl. No.: 18/753,800

(22) Filed: Jun. 25, 2024

(51) Int. Cl.
| | |
|---|---|
| *B60W 60/00* | (2020.01) |
| *B60W 50/06* | (2006.01) |
| *G06F 40/40* | (2020.01) |
| *G06V 20/40* | (2022.01) |
| *G06V 20/58* | (2022.01) |
| *G10L 15/183* | (2013.01) |
| *G10L 15/22* | (2006.01) |
| *B60W 50/00* | (2006.01) |

(52) U.S. Cl.
CPC ........ *B60W 60/0013* (2020.02); *B60W 50/06* (2013.01); *G06F 40/40* (2020.01); *G06V 20/41* (2022.01); *G06V 20/58* (2022.01); *G10L 15/183* (2013.01); *G10L 15/22* (2013.01); *B60W 2050/0083* (2013.01); *B60W 2420/403* (2013.01)

(58) Field of Classification Search
CPC .............. B60W 40/09; B60W 50/085; B60W 2540/30; G05D 1/0088; G01C 21/3484; G06V 20/47
See application file for complete search history.

(56) References Cited

U.S. PATENT DOCUMENTS

| | | | |
|---|---|---|---|
| 2019/0258251 A1* | 8/2019 | Ditty ................... | G06F 15/7807 |
| 2024/0132115 A1* | 4/2024 | Schneider ......... | B60W 60/0053 |
| 2025/0042444 A1* | 2/2025 | Wang .................... | B60W 40/09 |

* cited by examiner

*Primary Examiner* — Erin M Piateski
*Assistant Examiner* — John C Merino
(74) *Attorney, Agent, or Firm* — Maiorana Patent Law, PA

(57) ABSTRACT

An apparatus comprising an interface and a processor. The interface may receive baseline driving data of a driver, pixel data of an environment near a vehicle and vehicle navigation input from the driver. The processor may initialize a programmable driving stack for the vehicle in response to the baseline driving data of the driver, monitor for intervention events from the driver, determine edge case parameters for the driver in response to an analysis of the intervention events, generate a personalized driving model for the driver in response to the baseline driving data and the edge case parameters and update the programmable driving stack using the personalized driving model. The analysis of the intervention events may comprise the video-to-text analysis of the video frames to generate a text description of the environment. An AI model may generate the edge case parameters in response to the text description.

20 Claims, 12 Drawing Sheets

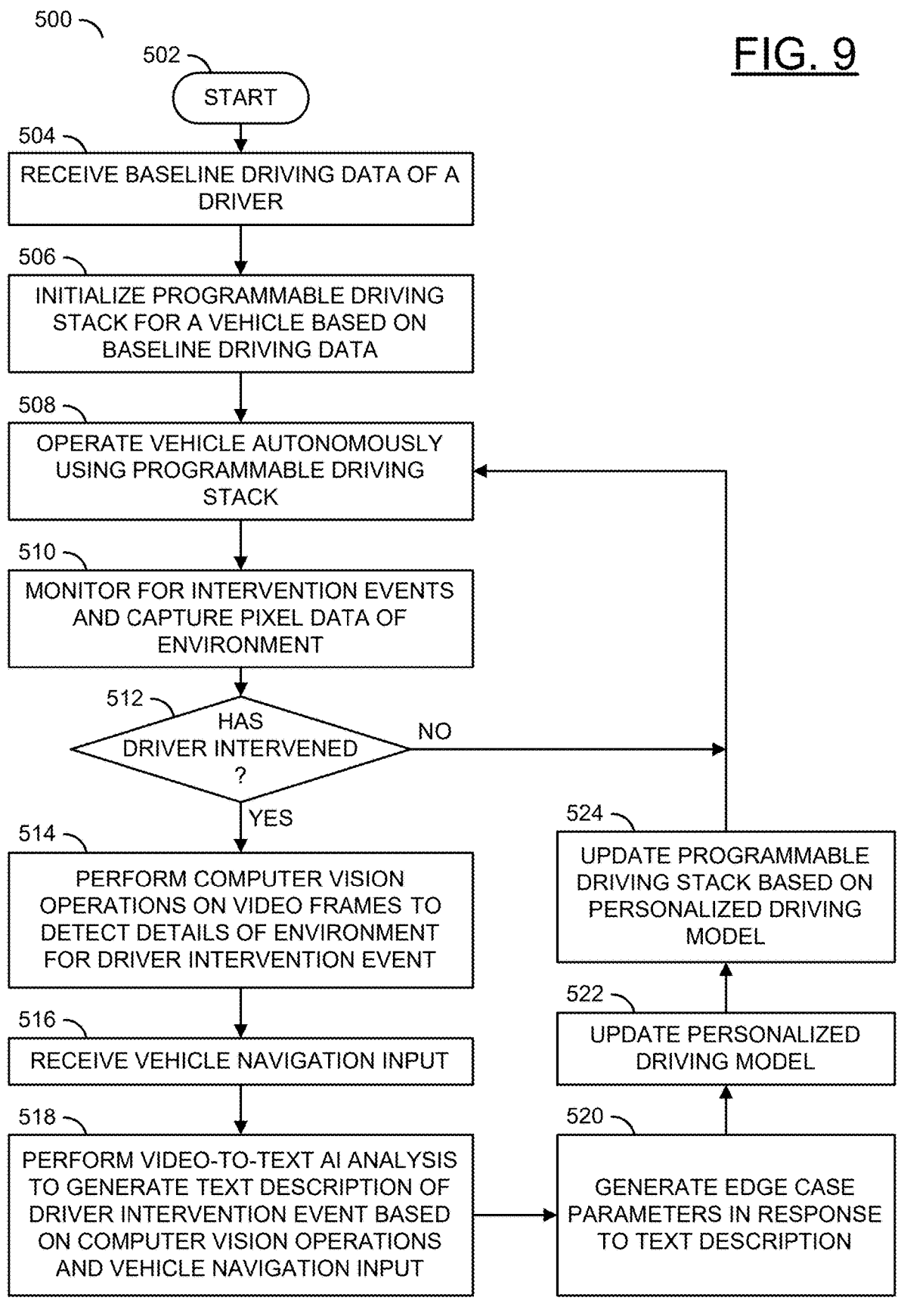

500

502 START

504 RECEIVE BASELINE DRIVING DATA OF A DRIVER

506 INITIALIZE PROGRAMMABLE DRIVING STACK FOR A VEHICLE BASED ON BASELINE DRIVING DATA

508 OPERATE VEHICLE AUTONOMOUSLY USING PROGRAMMABLE DRIVING STACK

510 MONITOR FOR INTERVENTION EVENTS AND CAPTURE PIXEL DATA OF ENVIRONMENT

512 HAS DRIVER INTERVENED? NO

YES

514 PERFORM COMPUTER VISION OPERATIONS ON VIDEO FRAMES TO DETECT DETAILS OF ENVIRONMENT FOR DRIVER INTERVENTION EVENT

516 RECEIVE VEHICLE NAVIGATION INPUT

518 PERFORM VIDEO-TO-TEXT AI ANALYSIS TO GENERATE TEXT DESCRIPTION OF DRIVER INTERVENTION EVENT BASED ON COMPUTER VISION OPERATIONS AND VEHICLE NAVIGATION INPUT

524 UPDATE PROGRAMMABLE DRIVING STACK BASED ON PERSONALIZED DRIVING MODEL

522 UPDATE PERSONALIZED DRIVING MODEL

520 GENERATE EDGE CASE PARAMETERS IN RESPONSE TO TEXT DESCRIPTION

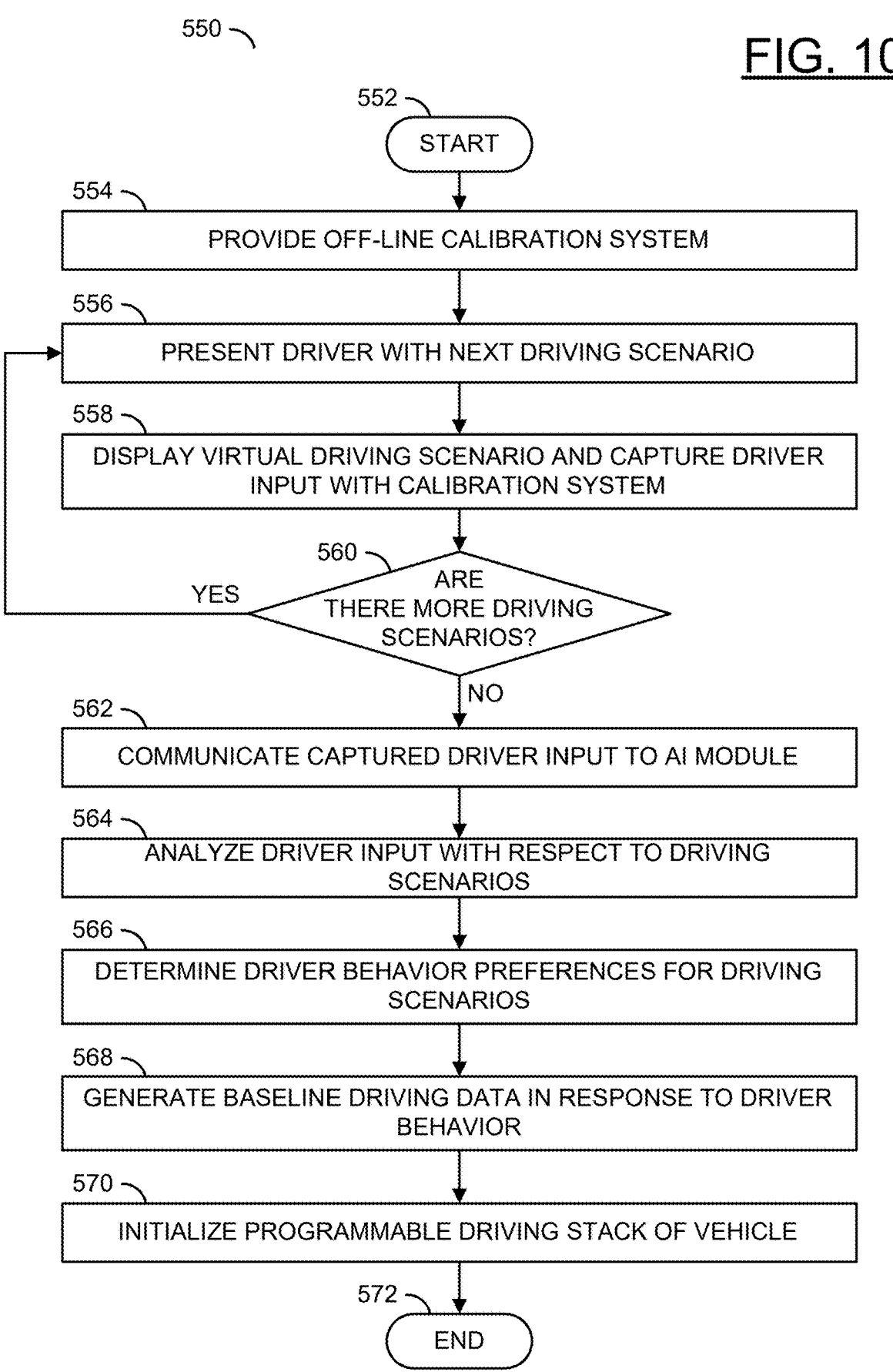

552

START

554

PROVIDE OFF-LINE CALIBRATION SYSTEM

556

PRESENT DRIVER WITH NEXT DRIVING SCENARIO

558

DISPLAY VIRTUAL DRIVING SCENARIO AND CAPTURE DRIVER INPUT WITH CALIBRATION SYSTEM

560

ARE THERE MORE DRIVING SCENARIOS?

YES

NO

562

COMMUNICATE CAPTURED DRIVER INPUT TO AI MODULE

564

ANALYZE DRIVER INPUT WITH RESPECT TO DRIVING SCENARIOS

566

DETERMINE DRIVER BEHAVIOR PREFERENCES FOR DRIVING SCENARIOS

568

GENERATE BASELINE DRIVING DATA IN RESPONSE TO DRIVER BEHAVIOR

570

INITIALIZE PROGRAMMABLE DRIVING STACK OF VEHICLE

572

END

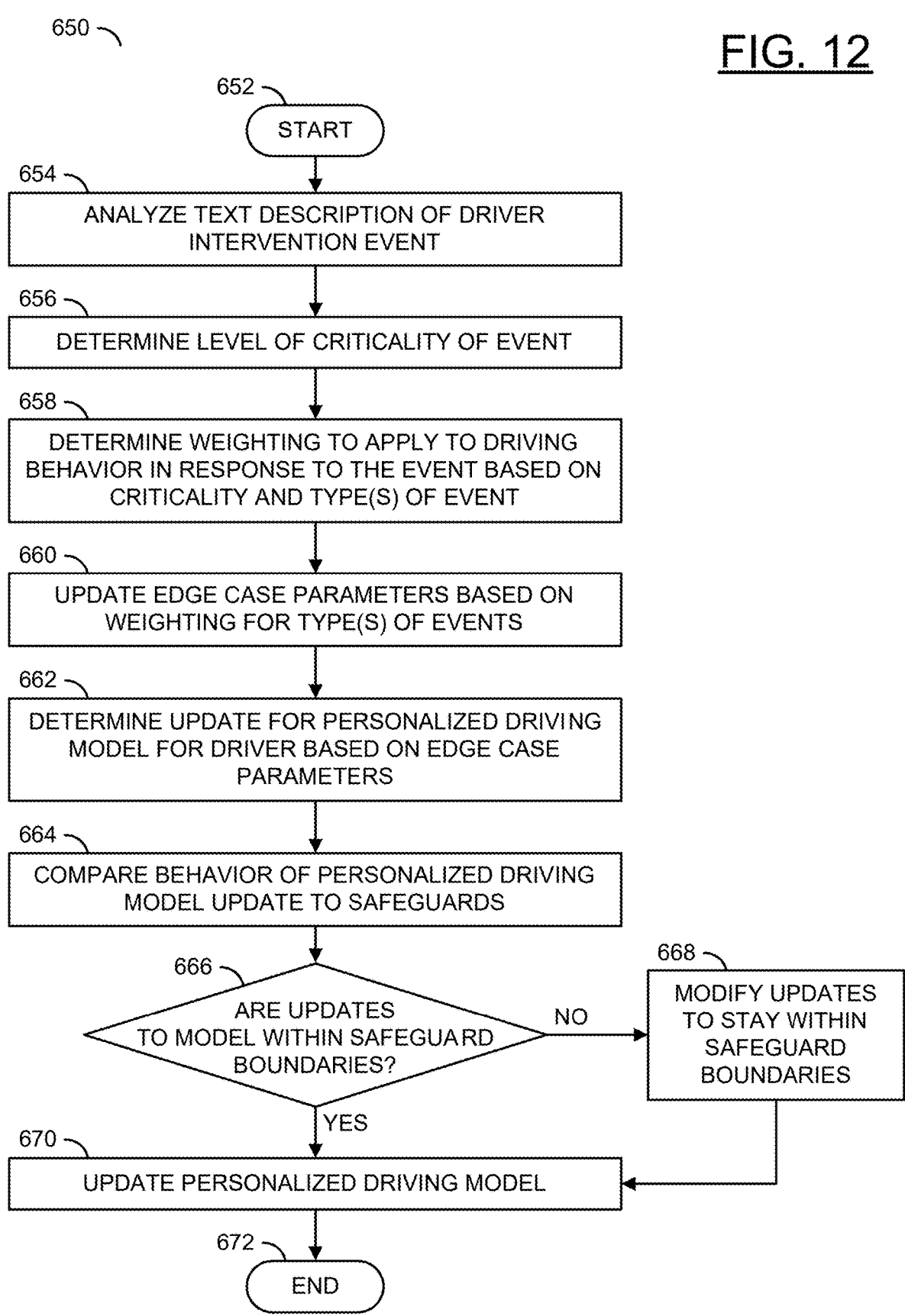

652
START

654
ANALYZE TEXT DESCRIPTION OF DRIVER INTERVENTION EVENT

656
DETERMINE LEVEL OF CRITICALITY OF EVENT

658
DETERMINE WEIGHTING TO APPLY TO DRIVING BEHAVIOR IN RESPONSE TO THE EVENT BASED ON CRITICALITY AND TYPE(S) OF EVENT

660
UPDATE EDGE CASE PARAMETERS BASED ON WEIGHTING FOR TYPE(S) OF EVENTS

662
DETERMINE UPDATE FOR PERSONALIZED DRIVING MODEL FOR DRIVER BASED ON EDGE CASE PARAMETERS

664
COMPARE BEHAVIOR OF PERSONALIZED DRIVING MODEL UPDATE TO SAFEGUARDS

666
ARE UPDATES TO MODEL WITHIN SAFEGUARD BOUNDARIES?

668
MODIFY UPDATES TO STAY WITHIN SAFEGUARD BOUNDARIES

NO

YES

670
UPDATE PERSONALIZED DRIVING MODEL

672
END

AUTO-CALIBRATION FOR PERSONALIZED SELF-DRIVING EXPERIENCE

FIELD OF THE INVENTION

The invention relates to autonomous driving generally and, more particularly, to a method and/or apparatus for implementing auto-calibration for personalized self-driving experience.

BACKGROUND

Vehicle manufacturers are continually working towards achieving autonomous driving. Some consumers are still skeptical about the concept. Driving experience is very personal and conventional automated driving functions offered by automotive OEMs are crude and do not address the concept of personalized driving preferences. Without addressing the personal nature of the driving experience, growth and acceptance of automated driving functions can be limited in the market. Limited acceptance of automated driving functions potentially adversely affects all drivers on the road as systems with a higher degree of safety are not being adopted.

Conventional automated driving systems, such various offerings that advertise full self driving, have implicit bias in the algorithms used for self driving that is a product of the programmers who developed the code (i.e., the personal inputs/weights). Despite offering multiple levels of "aggressiveness" to select from during operation of full self driving mode, the driver is left with an experience that is far different from how they would manually drive in a given scenario. Conventional automated driving systems are designed to adapt how the car drives itself rather than learning how the occupants of the vehicle would like to be driven. Conventional automated driving systems do not change over time in a way that reflects the personalized experience more closely.

It would be desirable to implement auto-calibration for personalized self-driving experience.

SUMMARY

The invention concerns an apparatus comprising an interface and a processor. The interface may be configured to receive baseline driving data of a driver, pixel data of an environment near a vehicle and vehicle navigation input from the driver. The processor may be configured to initialize a programmable driving stack for the vehicle in response to the baseline driving data of the driver, monitor for intervention events from the driver, determine edge case parameters for the driver in response to an analysis of the intervention events, generate a personalized driving model for the driver in response to the baseline driving data and the edge case parameters and update the programmable driving stack using the personalized driving model. The analysis of the intervention events may comprise the processor processing the pixel data arranged as video frames, performing computer vision operations on the video frames to detect details about the environment, performing video-to-text analysis of the video frames to generate a text description of the details about the environment, and adding the vehicle navigation input to the text description. The processor may comprise an AI model configured to generate the edge case parameters in response to the text description and update the personalized driving model in response to the edge case parameters.

BRIEF DESCRIPTION OF THE FIGURES

Embodiments of the invention will be apparent from the following detailed description and the appended claims and drawings.

FIG. 9 is a flow diagram illustrating a method for auto-calibration for a personalized self-driving experience.

FIG. 10 is a flow diagram illustrating a method for generating baseline driving data using off-line calibration.

FIG. 12 is a flow diagram illustrating a method for constraining the personalized driving model based on safeguard boundaries.

DETAILED DESCRIPTION OF THE EMBODIMENTS

Figure 1:
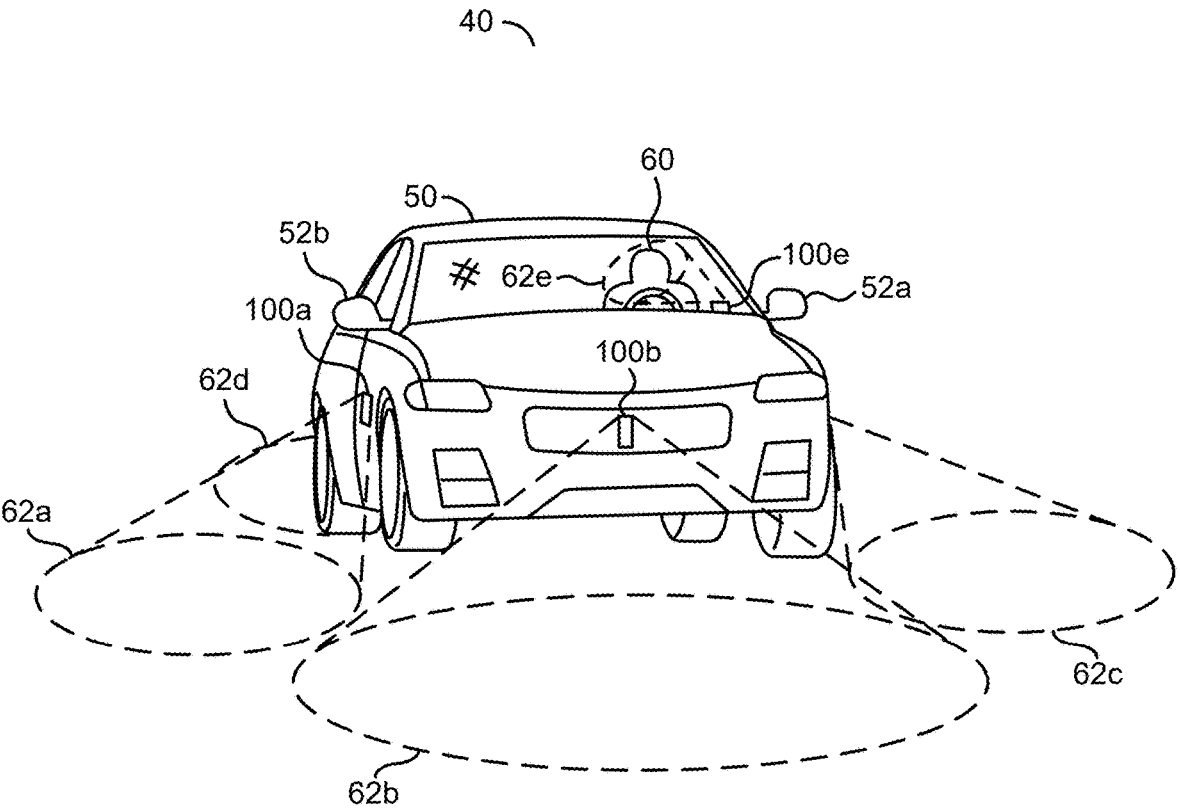
FIG. 1 is a diagram illustrating an example embodiment of the present invention configured to provide an all-around view of a vehicle.

Embodiments of the present invention include providing auto-calibration for personalized self-driving experience that may (i) be configured to update a driving stack for an autonomous driving system, (ii) perform video-to-text to generate a natural text description of a driving scenario, (iii) provide a simulation for determining baseline driving data for a driver, (iv) detect driver intervention events while a vehicle is driven autonomously, (v) capture vehicle, video and sensor parameters in real-time to describe a driver intervention event, (vi) perform a personalized calibration of an autonomous driving system based on driver baseline data and data from driver interventions, (vii) limit personalization of the autonomous driving system to within safeguard boundaries, (viii) enable learning to match an autonomous driving system to a driving style of a vehicle occupant, and/or (ix) be implemented as one or more integrated circuits.

Embodiments of the present invention may be configured to enable an autonomous driving system to learn a personal driving style of an occupant (e.g., a driver) of a vehicle. Personalization of the driving style of the vehicle occupant by the autonomous driving system may enhance comfort for people being driven by an autonomous vehicle. Personalizing a behavior of the autonomous driving system may provide individualized data such as weights and/or biases for use by the automated driving system that enables a granularity for adjusting the autonomous driving system beyond basic categories. For example, instead of providing limited options for the autonomous driving system behavior, such as three levels of driving aggressiveness, the personalization of the autonomous driving system may enable a match between the behavior of the autonomous driving system and the driving preferences and/or the idiosyncrasies of a driver.

Embodiments of the present invention may be configured to output parameters (e.g., weights and/or biases) that may be compatible with inputs for an autonomous driving system. The parameters may be configured to personalize the autonomous driving system based on driving habits of a particular person. For example, the parameters may be used to update a programmable driving stack implemented by the autonomous driving system. The parameters for programming the driving stack may be learned over time based on data generated in response to interventions made by a driver while the vehicle is being controlled autonomously (e.g., when the driver manually intervenes).

Embodiments of the present invention may be configured to generate baseline data for personalization for a driver. In some embodiments, the baseline data may be generated before the driver ever uses the particular vehicle (e.g., initial calibration may be performed using a driving simulator). A driver may undergo initial calibration for personalization. A simulated calibration sequence may be implemented. The simulated calibration sequence may be configured to provide the driver with various driving scenarios in order to gather baseline driving data about the driving behavior/preferences of the driver. For example, the calibration system may enable a driver to navigate various driving scenarios presented and gather information about how the driver behaves and/or engages with the vehicle. The calibration system may generate the baseline driving data in response to the driving behavior of the driver to learn about the driver. The baseline driving data may be used to enable the autonomous driving system of the vehicle to learn how the driver would drive the vehicle if driven manually in a range of various driving scenarios. The parameters generated in response to the initial calibration may comprise the baseline driving data for personalization of the driving experience. The baseline driving data may be used to initialize the programmable driving stack of the vehicle to calibrate the autonomous driving mode to operate more closely to how the owner/driver would drive the vehicle.

The vehicle may be delivered and/or first used by the driver/owner/occupant with the driving stack initialized using the baseline driving data. For example, the driver may be able to use the autonomous driving system with an initial level of personalization. While the driver uses the vehicle autonomously (e.g., post-initial calibration), embodiments of the present invention may be configured to continually gather data about the environment and/or inputs to the vehicle. In one example, cameras installed on the vehicle (pre-installed and/or post-market cameras) may capture video of an environment near the vehicle. In another example, radar data and/or lidar data of the environment may be captured. In yet another example, the vehicle may capture inputs to vehicle controls (e.g., steering wheel input, acceleration/braking data, use of indicators, gear selection data, etc.). In still another example, audio may be captured (e.g., a driver may verbally explain what they like or do not like about autonomous actions performed by the vehicle). The data gathered while the vehicle is being driven autonomously may be used to continue to learn more details about the driving preferences/personalization of the vehicle owner/driver.

In some embodiments, the driver may intervene in a particular situation/scenario encountered by the autonomous driving system. For example, the driver may intervene when the vehicle behaves erratically and/or provides a response that the driver is not comfortable with. In order to learn about the preferences of the driver, the data about the environment and/or the inputs to the vehicle may be recorded in response to a driver intervention event. For example, when the driver intervention event is detected, the video, driver audio input (e.g., via a voice feedback system) and/or vehicle parameters may be captured in real-time. Embodiments of the present invention may determine why the driver intervened and/or determine an event significance (e.g., a level of criticality). For example, the event significance may indicate a seriousness, urgency and/or importance the driving intervention event (e.g., on a scale of 1-10). In one example, an event significance may be high (e.g., a level 10 event) if a driver intervenes to avoid an impact. In another example, an event significance may be low (e.g., a level 1 event) if a driver intervenes for personal comfort reasons (e.g., the driver changes lanes to avoid following a vehicle emitting heavy exhaust fumes). The particular event significance applied to various types of events may be varied according to the design criteria of a particular implementation.

Embodiments of the present invention may be configured to implement one or more artificial intelligence (AI) models. In one example, one AI model implemented may be a video-to-text AI model. In another example, one AI model implemented may be a convolutional neural network configured to perform object detection based on computer vision. In yet another example, one AI model implemented may be a large language model (LLM) configured to generate natural (e.g., plain language) text. In still another example, one AI model implemented may be a Large Language-and-Vision Assistant (LlaVa) model configured to provide a vision encoder and LLM for visual and language understanding. The number and/or types of AI models implemented may be varied according to the design criteria of a particular implementation.

One or more of the AI models implemented may be configured to receive the real-time driving data corresponding to the driver intervention event. The AI model(s) may generate a textual description of the driver intervention event. The textual description of the driver intervention event may be used to generate updated calibration parameters for the autonomous driving system. The updated calibration parameters may be configured to enable further personalization based on the behavior of the driver. For example, the baseline driving data may determine driver behavior in response to common driving scenarios, and the driver intervention event data may determine driver behavior in response to edge cases and/or uncommon scenarios. The calibration parameters generated in response to the driver intervention events may be configured to continually enhance a feel of the autonomous driving system (e.g., enable the autonomous system to more closely match the personalized driving style of the driver/owner). For example, updating the programmable driving stack over time may enable learning how to drive more like the owner.

The amount of calibration and/or personalization of the autonomous driving system may be limited. For example, the updates to the driving stack may be bound based on safeguards. The safeguards may prevent calibrating the autonomous driving system outside "safe operation" regardless of the behavior of the driver detected in response to the driver intervention events. In one example, the safeguards may provide limitations based on driving rules, laws and/or regulations. In yet another example, the safeguards may provide limitations provided by a vehicle manufacturer (e.g., to prevent a vehicle from tipping over, losing control, consuming too much energy, etc. based on the design of the vehicle). In still another example, the safeguards may provide limitations based on various customs (e.g., preventing racing ahead in a merge lane to avoid a zipper merge). The type of safeguards implemented may be varied according to the design criteria of a particular implementation.

Referring to FIG. 1, a diagram illustrating an example embodiment of the present invention configured to provide an all-around view of a vehicle is shown. An external view 40 for a vehicle 50 is shown. In the example shown, the vehicle 50 may be a consumer vehicle. For example, the vehicle 50 may be a sedan, a SUV, a performance vehicle, a minivan, a crossover, etc. In some embodiments, the vehicle 50 may be a commercial vehicle (e.g., a utility van, a package delivery vehicle, a service van, a public transport van, etc.). In some embodiments, the vehicle 50 may be a commercial truck (e.g., a semi-trailer truck). In some embodiments, the vehicle 50 may be a pickup truck (e.g., a light duty vehicle, a medium duty vehicle, a heavy duty vehicle, etc.). In some embodiments, the vehicle 50 may be a public transportation vehicle (e.g., a bus). The vehicle 50 may be an internal combustion engine (ICE) vehicle, a diesel vehicle, a hybrid electric vehicle, a battery electric vehicle, etc. The type of the vehicle 50 implemented may be varied according to the design criteria of a particular implementation.

External side view mirrors 52a-52b are shown on the vehicle 50. The side view mirror 52a may be a side view mirror on the driver side of the vehicle 50. The side view mirror 52b may be a side view mirror on the passenger side of the vehicle 50. A driver 60 is shown in the interior of the vehicle 50. The vehicle 50 may comprise devices 100a-100n. The devices 100a-100n may be camera systems. Camera systems 100a-100b are shown integrated as part of the vehicle 50. The camera system 100a is shown on a passenger side of the vehicle 50. The camera system 100a is shown below the passenger side view mirror 52b. The camera system 100b is shown on the front grille of the vehicle 50. In the perspective of the vehicle 50 shown, three of the camera systems 100a-100b and 100e may be visible. However, one of the camera systems 100a-100n may be implemented at a level below the driver side view mirror 52a (not visible from the perspective of the external view 40 shown). Other camera systems 100a-100n may be located throughout the exterior and/or interior of the vehicle 50. The camera systems 100a-100n may be configured to capture an all-around view of the environment 40 near the vehicle 50.

Dashed lines 62a-62e are shown. In the example shown, the dashed lines 62a are shown extending from the camera system 100a and the dashed lines 62b are shown extending from the camera system 100b towards the exterior of the vehicle. The dashed lines 62c-62d may similarly extend from respective camera systems 100c-100d (not visible from the perspective shown). The dashed lines 62a-62d may provide an illustrative representation of fields of view captured by each of the camera systems 100a-100d. The fields of view 62a-62d together may provide an all-around view of the environment near the vehicle 50.

The all-around view 62a-62d is shown. In an example, the all-around view 62a-62d may enable an all-around view (AVM) system. The AVM system may comprise four cameras (e.g., each camera may comprise a combination of one of the camera systems 100a-100n and/or a stereo pair of the lenses implemented by the camera systems 100a-100n). In the perspective shown in the external view 40, the camera system 100a and the camera system 100b may each be one of the four cameras and the other two cameras may not be visible. In an example, the camera system 100b may be a camera located on the front grille of the vehicle 50, one of the cameras may be on the rear (e.g., over the license plate), the camera system 100a may be located below the side view mirror 52b on the passenger side and one of the cameras may be located below the side view mirror 52a on the driver side. The arrangement of the cameras may be varied according to the design criteria of a particular implementation.

The dashed lines 62e are shown are shown extending from the camera system 100e towards an interior of the vehicle 50. The camera system 100e may be a cabin monitoring camera system. The camera system 100e may be configured to capture the field of view 62e of the cabin of the vehicle 50. The field of view 62e may be directed towards the driver 60. In some embodiments, the field of view 62e may be directed towards the driver 60 and/or other occupants of the vehicle 50. In some embodiments, more than one of the camera systems 100a-100n may be directed towards the interior of the vehicle 50. For example, one or more of the camera systems 100a-100n may be implemented in a cargo area of the vehicle 50 (e.g., with one of the field of views 62a-62n configured to monitor cargo and/or items carried by the vehicle 50). Details of cargo monitoring may be described in association with U.S. application Ser. No. 18/583,298, filed on Feb. 21, 2024, appropriate portions of which are incorporated by reference. The camera systems 100a-100n may be configured to capture the all-around view of the vehicle 50 and/or the interior of the vehicle 50. The particular location of the camera systems 100a-100n and/or the field of views 62a-62e may be varied according to the design criteria of a particular implementation.

In some embodiments, each of the camera systems 100a-100e may be configured to capture pixel data arranged as video frames. In some embodiments, each of the camera systems 100a-100d providing the all-around view 62a-62d and/or the camera system 100e providing the cabin view may implement a fisheye lens (e.g., may capture a video frame with a 180 degree angular aperture). The all-around view 62a-62d is shown providing a field of view coverage all around the vehicle 50. For example, the portion of the all-around view 62a may provide coverage for a passenger side of the vehicle 50, the portion of the all-around view 62b may provide coverage for a front of the vehicle 50, the portion of the all-around view 62c may provide coverage for a driver side of the vehicle 50 and the portion of the all-around view 62d may provide coverage for a rear of the vehicle 50. Each portion of the all-around view 62a-62d may be one field of view of a camera mounted to the vehicle 50. Each portion of the all-around view 62a-62d may be dewarped and stitched together by the video processors to provide an enhanced video frame that represents a top-down view near the vehicle 50. The camera systems 100a-100d may be configured to implement a Bird's Eye View Transformer network (e.g., a deep learning model designed to generate BEV representations from multi-camera images). In an example, the all-around view 62a-62d may be used to provide a representation of a bird's-eye view of the vehicle 50.

The camera systems 100a-100e may provide a representative example of the mechanism for image acquisition. In one example, the camera systems 100a-100e may be implemented as monocular cameras. In another example, the camera systems 100a-100e may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the vehicle 50. In some embodiments, the camera systems 100a-100n may be installed as an aftermarket product. For example, the vehicle 50 may be sold without a camera and one or more of the camera systems 100a-100n may be installed on the vehicle 50. The implementation and/or locations of the camera systems 100a-100e on the vehicle 50 and/or the orientation of the camera systems 100a-100e may be varied according to the design criteria of a particular implementation.

The vehicle 50 may be configured to operate manually (e.g., driven by the driver 60), operate semi-autonomously (e.g., provide a level of driver assistance features to aid the driver 60) and/or operate autonomously (e.g., fully autonomously without input from the driver 60). For simplicity, even in scenarios that describe the vehicle 50 as operating fully autonomously, at least one occupant in the vehicle 50 may be referred to as the driver 60. In one example, the driver 60 may provide some or all vehicle control input to the vehicle 50. In another example, the driver 60 may provide no input to the vehicle 50, while the vehicle operates autonomously. In yet another example, the driver 60 may manually intervene while the vehicle 50 operates autonomously (e.g., the manual intervention may correct errors by an autonomous driving system, may provide training data for the autonomous driving system, take over control when the autonomous driving system is incapable of navigating a particular scenario, etc.). In some embodiments, the driver 60 may be an owner of the vehicle 50. In some embodiments, the driver 60 may be one of many occupants of the vehicle 50 that may be operating autonomously (e.g., the driver 60 may not be providing input to navigate the vehicle 50 but may be the occupant sitting in a seat that is traditionally the driver seat).

The vehicle 50 may operate autonomously in response to sensor input. In one example, the autonomous operation of the vehicle 50 may be performed based on the video data generated by the camera systems 100a-100e. In another example the autonomous operation of the vehicle 50 may be performed based on a combination of sensor data (e.g., video data, radar data, lidar data, etc.). The implementation of the autonomous driving system of the vehicle 50 may be varied according to the design criteria of a particular implementation.

Figure 2:
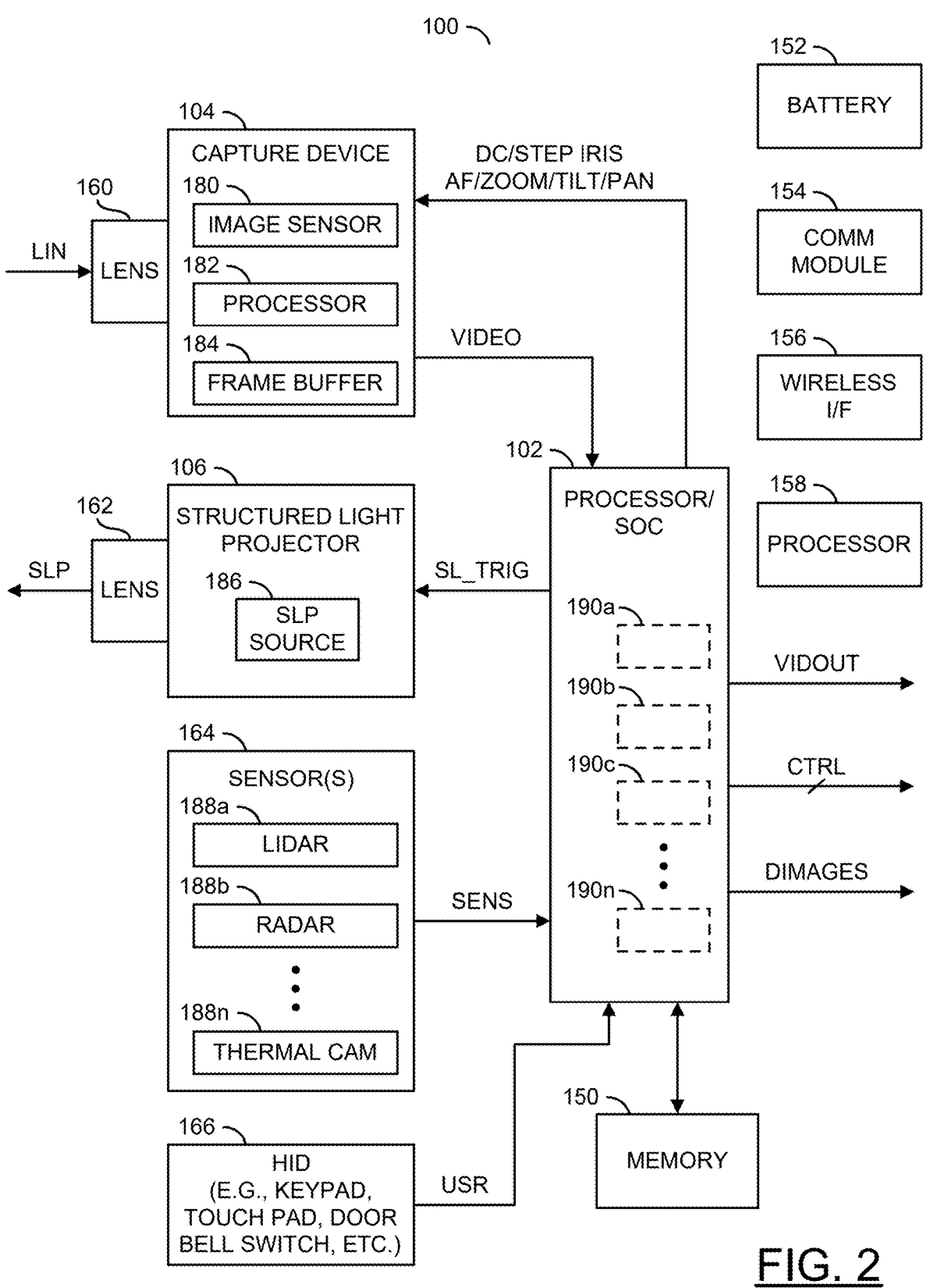
FIG. 2 is a block diagram illustrating a camera system configured to implement auto-calibration for a personalized self-driving experience.

Referring to FIG. 2, a block diagram illustrating a camera system configured to implement auto-calibration for a personalized self-driving experience is shown. A camera system 100 is shown. The camera system 100 may be a representative example of the cameras 100a-100n shown in association with FIG. 1. The camera system 100 may comprise a block (or circuit) 102, a block (or circuit) 104 and/or a block (or circuit) 106. The circuit 102 may implement a processor. The circuit 104 may implement a capture device. The circuit 106 may implement a structured light projector.

The processor 102 may be configured to implement an artificial neural network (ANN). In an example, the ANN may comprise a convolutional neural network (CNN). The processor 102 may be configured to implement a large language model (LLM). The processor 102 may be configured to implement a Bird's Eye View Transformer network. The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment 40). The capture device 104 may capture the pixel data comprising a background image (e.g., the environment 40) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.). In some embodiments, calculations and/or other operations to initialize and/or generate results for an AI model may be performed locally by the processor 102.

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPl-CSl/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a Display-Port interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors. In the example shown, the sensors 164 may comprise blocks (or circuits) 188a-188n. The circuit 188a may implement a lidar. The circuit 188b may implement a radar. The circuit 188n may implement a thermal camera. The sensors 164 may comprise other types of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

The lidar 188a may be configured to generate a point cloud of the environment 40 (e.g., representing distances to various objects measured by the lidar 188a). The radar 188b may be configured to generate a high resolution radar map of the environment 40. The thermal camera 188n may be configured to capture a thermal image (e.g., a heat map of the environment 40). Each of the sensors 164 may provide an independent source of information about the environment 40. The number, type of sensor, and/or type of data generated by the sensors 164 may be varied according to the design criteria of a particular implementation.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view.

However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

The processor/SoC 102 may receive the signal VIDEO, the signal SENS and/or the signal USR. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, the signal USR and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly, other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline, a radar signal processing pipeline and/or an AI processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15,593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/ or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/ model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model, a video-to-text AI model, a sensor data-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the edge devices 100a-100n.

One of the hardware modules 190a-190n (e.g., 190c) may implement a sensor fusion module. The sensor fusion module 190c may be configured to receive the data from the sensors 164. In an example, the sensor fusion module 190c may be configured to receive a point cloud generated by the lidar 188a. In another example, the sensor fusion module 190c may be configured to receive a high resolution radar map from the radar module 188b. In yet another example, the sensor fusion module 190c may be configured to receive a thermal image from the thermal camera 188n. The sensor fusion module 190c may be configured to analyze independent sources of data together in order to make inferences about the data (e.g., inferences that may not be capable of determining from each individual data source, alone). The sensor fusion module 190c may be configured to determine the inferences in response to an analysis of the sensor data (e.g., provided by the signal SENS) and the video frames.

For example, a combination of information from the video frames and the sensor data may provide additional context about the environment 40.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 3:
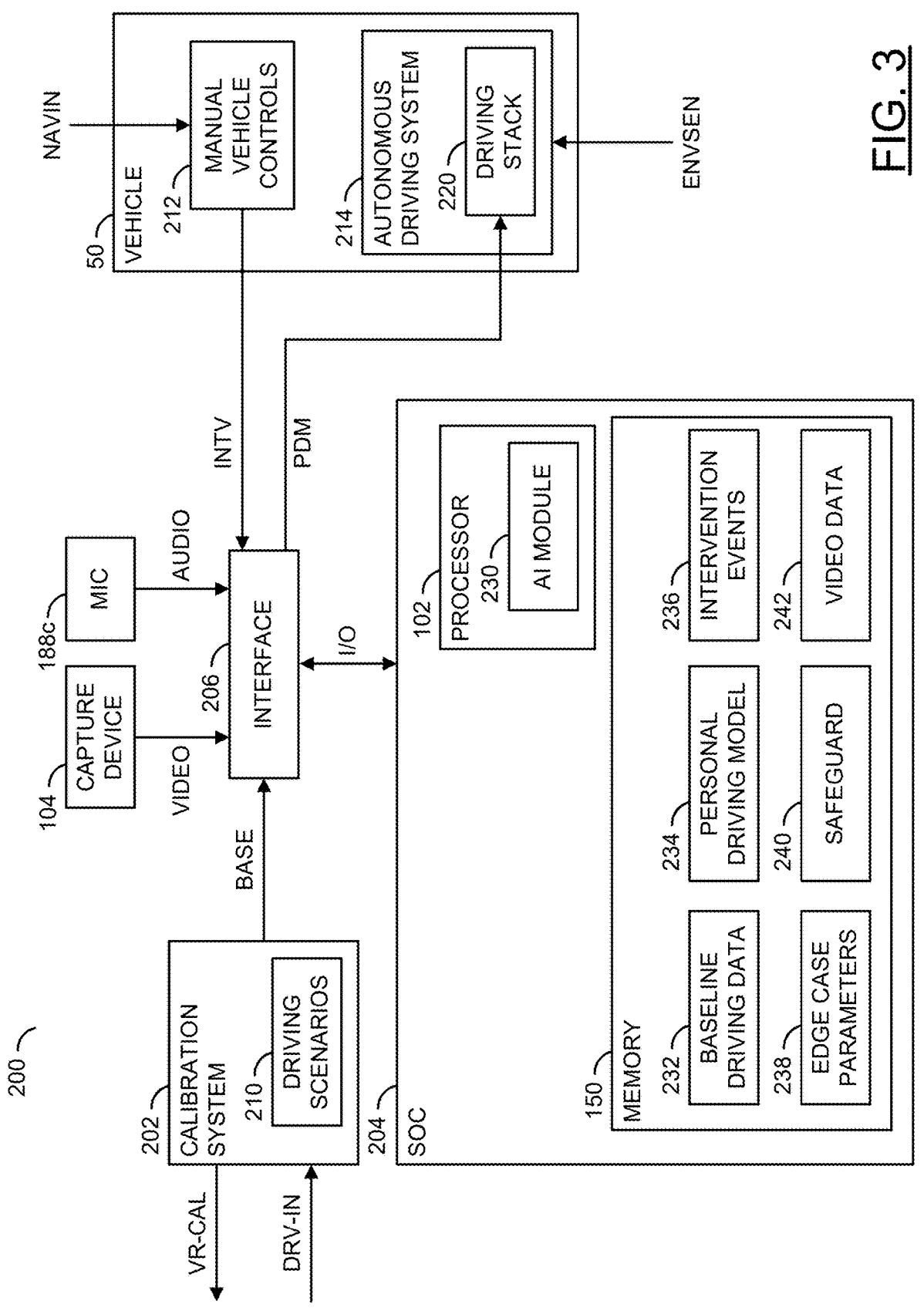
FIG. 3 is a block diagram illustrating an auto-calibration system in accordance with an embodiment of the present invention.

Referring to FIG. 3, a block diagram illustrating an auto-calibration system in accordance with an embodiment of the present invention is shown. An auto-calibration system 200 is shown. The auto-calibration system 200 may be configured to determine baseline driving data based on an initial calibration and/or generate edge case parameters in response to an analysis of driver intervention events. The auto-calibration system 200 may be configured to generate a personalized driving model for a driver/owner/occupant of the vehicle 50 in response to the baseline driving data and the edge case parameters. The auto-calibration system 200 may be configured to program an autonomous driving system of the vehicle 50 based on the personalized driving model. The autonomous driving system of the vehicle 50 may be configured to implement autonomous driving that may be customized to the driver/owner/occupant in response to the personalized driving model.

The auto-calibration system 200 may comprise the vehicle 50, the capture device 104, the sensor 188c, a block (or circuit) 202, a block (or circuit) 204 and/or a block (or circuit) 206. The capture device 104 is shown as a representative example of cameras implemented by the camera systems 100a-100e (e.g., multiple cameras may be implemented). The sensor 188c may be a microphone. The circuit 202 may implement a calibration system. The circuit 204 may implement a system-on-chip (SoC). The circuit 206 may implement an interface. The auto-calibration system 200 may comprise additional components (not shown). While the components of the auto-calibration system 200 may be shown separately for illustrative purposes, one or more of the components may operate together. For example, the interface 206 may be implemented on the vehicle 50 with the SoC 204, the capture device 104 and/or the sensors 188a-188n. Generally, the calibration system 202 may be separate from the other components of the auto-calibration system 200. The number, type and/or arrangement of the components of the auto-calibration system 200 may be varied according to the design criteria of a particular implementation.

The calibration system 202 may be configured to determine the baseline driving data for the driver 60. The calibration system 202 may be configured to generate a signal (e.g., VR-CAL) and/or a signal (e.g., BASE). The calibration system 202 may be configured to receive a signal (e.g., DRV-IN). The signal VR-CAL may provide output to a display and/or multimedia system. In one example, the signal VR-CAL may comprise video and/or audio for a virtual reality headset. In another example, the signal VR-CAL may provide video for a display and audio for speakers. Generally, the signal VR-CAL may output data to provide simulated driving scenarios. The signal DRV-IN may comprise calibration driver input. For example, the calibration system 202 may be configured to receive input from the driver 60 in response to the simulated driving scenarios. The signal DRV-IN may be used by the calibration system 202 to determine the baseline driving behavior of the driver 60. The signal BASE may comprise the baseline driving behavior of the driver 60. The signal BASE may be generated in response to the signal DRV-IN. The signal BASE may be presented to the interface 206. The number, type and/or data provided by the signals VR-CAL, DRV-IN and/or BASE may be varied according to the design criteria of a particular implementation.

The calibration system 202 may comprise a block (or module) 210. The module 210 may comprise driving scenarios. The driving scenarios 210 may comprise data (e.g., video, audio and/or timing data) for common driving scenarios. The video/audio from the driving scenarios 210 may be output via the signal VR-CAL. The calibration system 202 may receive input (e.g., the signal DRV-IN) from the driver 60 in response to the driving scenarios 210. The calibration system 202 may use the timing data from the driving scenarios 210 to correlate the input received from the driver 60 to the driving scenarios 210. Based on the correlation of the driver input DRV-IN to the timing of the driving scenarios 210, the calibration system 202 may determine the baseline driving behavior of the driver 60. The baseline driving behavior may determine how the driver 60 prefers to drive in various common driving scenarios. In some embodiments, the baseline driving data may be determined by the calibration system 202 and communicated to the interface 206. In some embodiments, the driver input, and/or timing data for the driving scenarios 210 may be presented to the interface 206 and the processor 102 may determine the baseline driving data. Details of the calibration system 202 may be described in association with FIG. 5.

The vehicle 50 may be configured to operate autonomously and/or manually. The vehicle 50 may comprise a block (or circuit) 212 and/or a block (or circuit) 214. The circuit 212 may comprise manual vehicle controls. The circuit 214 may comprise an autonomous driving system. The vehicle 50 may comprise other components (not shown). The number, type and/or arrangement of the components of the vehicle 50 may be varied according to the design criteria of a particular implementation.

The manual vehicle controls 212 may comprise various components of the vehicle 50 that may be used by the driver 60 to control the vehicle 50. For example, the manual vehicle controls 212 may comprise a steering wheel, a brake pedal, an accelerator pedal (e.g., gas pedal), a gear shifter, an infotainment center, turn indicators, headlight controls, heating/cooling controls, wiper controls, etc. The driver 60 may provide input (e.g., NAVIN) to the manual vehicle controls 212. The manual vehicle controls 212 may be configured to cause the vehicle to respond (e.g., accelerate, turn, stop, decelerate, adjust various actuators such as wipers, headlights, heating/cooling, etc., change gears, etc.) to the input NAVIN. The manual vehicle controls 212 may be configured to convert the manual input provided by the driver 60 into computer readable data. In some embodiments, the manual vehicle controls 212 may operate the vehicle 50 based on the computer readable data generated in response to the input by the driver 60 (e.g., drive-by-wire). In some embodiments, the manual vehicle controls 212 may convert the driver input into a format readable by the processor 102. The driver input converted to computer readable data may be provided in a signal (e.g., INTV). The signal INTV may be communicated to the interface 206.

When the vehicle 50 is driven in a manual mode of operations, the manual vehicle controls 212 may be configured to enable the driver 60 to control the vehicle 50. When the vehicle 50 is operating autonomously, the signal NAVIN may comprise intervention controls by the driver 60. For example, the driver 60 may intervene using the manual vehicle controls 212 and the manual vehicle controls 212 may over-ride the autonomous control of the vehicle 50 based on the driver input provided by the signal NAVIN. In some embodiments, the vehicle 50 may resume autonomous control after the driver 60 stops providing the intervention input. In one example, the computer readable data of the driver input (e.g., the signal INTV) may comprise data that corresponds to a driver intervention event (e.g., when the driver 60 over-rides the autonomous control of the vehicle 50).

The autonomous driving system 214 may be configured to control the operation of the vehicle 50. For example, when the driver 60 is not providing input to the manual vehicle controls 212, the vehicle 50 may be controlled by the autonomous driving system 214. The autonomous driving system 214 may be configured to control the operation of the vehicle 50 (e.g., accelerate, decelerate, stop, turn, etc.). In some embodiments, the autonomous driving system 214 may be further configured to control the environmental conditions of the vehicle 50 (e.g., cabin temperature, audio output from cabin speakers, fan speed, etc.). The autonomous driving system 214 may be configured to control external signaling by the vehicle 50 (e.g., turn signals, audio output from external speakers, hazard lights, etc.). The type of autonomous control performed by the autonomous driving system 214 may be varied according to the design criteria of a particular implementation.

The autonomous driving system 214 may determine the autonomous controls for the vehicle 50 in response to a signal (e.g., ENVSEN). The signal ENVSEN may comprise environmental sensor data. The signal ENVSEN may comprise input from multiple sensor sources. For example, the autonomous driving system 214 may be configured to perform sensor fusion based on multiple disparate data sources. In one example, the signal ENVSEN may comprise video data generated by the camera systems 100a-100e. In another example, the signal ENVSEN may comprise lidar data and/or radar data. In yet another example, the signal ENVSEN may comprise a combination of lidar data, radar data, audio data, video data, etc. The type of environmental data used by the autonomous driving system 214 to autonomously control the vehicle 50 may be varied according to the design criteria of particular implementation.

The autonomous driving system 214 may comprise a block (or circuit) 220. The circuit 220 may comprise a driving stack. The driving stack 220 may be configured to define how the autonomous driving system 214 operates. In one example, the driving stack 220 may define rules that the autonomous driving system 214 may follow (e.g., rules and regulations of the road). In another example, the driving stack 220 may comprise weights, biases and/or other variables that define the autonomous operation of the vehicle 50. The driving stack 220 may comprise data that may control a behavior of the autonomous driving system 214. In one example, the driving stack 220 may comprise various levels and/or templates for autonomous driving behavior. For example, the driver 60 may select from templates that control how aggressive the autonomous driving system 214 operates (e.g., the driving stack 220 may set the weights/biases/variables to an aggressive template, a neutral template and/or a passive template). In another example, the driving stack 220 may set the autonomous driving system 214 according to a location (e.g., different jurisdictions may have different rules/regulations for how to drive). The type of behavior of the autonomous driving system 214 that may be controlled by the driving stack 220 may be varied according to the design criteria of a particular implementation.

The driving stack 220 may be programmable. Programming the driving stack 220 may tune the driving stack 220 towards particular types of behavior. Programming the driving stack 220 may set the weights/biases/variables stored by the driving stack 220 in memory to calibrate the autonomous driving system 214. The driving stack 220 may receive a signal (e.g., PDM). The signal PDM may be configured to program the driving stack 220. The signal PDM may be received from the interface 206. The signal PDM may comprise a personalized driving model. The personalized driving model communicated by the signal PDM may be configured to tune the driving stack 220 to behave more closely to the preferences and/or learned behaviors of the driver 60. For example, the signal PDM may comprise the weights/biases/variables that may be stored by the driving stack 220 to provide personalized data points to calibrate the autonomous driving system 214.

Programming the driving stack 220 using the personalized data points may enable the autonomous driving system 214 to behave similar to how the driver 60 would operate the vehicle if driving manually. Generally, the driving stack 220 may be initialized based on the baseline driving data generated by the calibration system 202. Over time, as the driver 60 provides the navigation input for the driver intervention events, the personalized driving model may be updated to learn more behaviors of the driver 60. The driving stack 220 may be updated continually, regularly and/or periodically to enable the behavior of the autonomous driving system 214 to change and/or adapt in response to the driver intervention events to be closer to the behavior of the driver 60.

The interface 206 may be configured to receive data for the SoC 204 and/or communicate data from the SoC 204. The interface 206 may be configured to send/receive sensor data, data from the calibration system 202, data to/from the SoC 204 and/or data to/from the vehicle 50. The interface 206 may comprise various inputs/outputs of the apparatus 100. In an example, the interface 206 may comprise pins, wires, connectors, etc. The interface 206 may be configured to receive the signal BASE, the signal INTV, the signal VIDEO and/or a signal (e.g., AUDIO). The signal AUDIO may comprise audio captured by the microphone 188c. The interface 206 may communicate the signal PDM. The interface 206 may communicate a signal (e.g., I/O). The signal I/O may comprise data received from the SoC 204. The signal I/O may comprise data communicated to the SoC 204. For example, one or more of the signals BASE, VIDEO, AUDIO and/or INTV may be communicated by the interface 206 to the SoC 204 via the signal I/O.

The SoC 204 may comprise the processor 102 and/or the memory 150. The SoC 204 may implement a circuit board with the processor 102, the memory 150 and/or other components. The SoC 204 may be configured to perform auto-calibration for a personalized self-driving experience.

The processor 102 is shown comprising a block (or circuit) 230. The circuit 230 may implement an artificial intelligence (AI) module. The AI module 230 may be configured to perform various AI operations. The processor 102 may comprise dedicated hardware modules configured to implement hardware acceleration for AI operations. In an example, the AI module 230 may be a neural processing unit (NPU). In one example, the AI module 230 may be configured to perform computer vision operations. In another example, the AI module 230 may be configured to perform video-to-text operations. In yet another example, the AI module 230 may be configured to convert sensor data and/or driving input data to text. In still another example, the AI module 230 may be configured to determine a behavior of the driver 60 in response to analyzing driver intervention events. Details of the AI module 230 may be described in association with FIG. 4. The type of AI operations performed by the AI module 230 may be varied according to the design criteria of a particular implementation.

The memory 150 may comprise a block (or module) 232, a block (or module) 234, a block (or module) 236, a block (or module) 238, a block (or module) 240, and/or a block (or module) 242. The block 232 may comprise baseline driving data. The block 234 may comprise a personal driving model. The block 236 may comprise intervention events. The block 238 may comprise edge case parameters. The block 240 may comprise safeguard data. The block 242 may comprise video data. The memory 150 may store other types of data (not shown). The type, format and/or amount of data stored by the memory 150 may be varied according to the design criteria of a particular implementation.

The baseline driving data 232 may comprise information about the preferences of the driver 60 corresponding to the driving scenarios 210. Generally, the baseline driving data 232 may provide the behavioral preferences of the driver 60 for the most common driving situations (e.g., the driving scenarios that may be the highest proportion of driving scenarios). For example, the baseline driving data 232 may cover all driving scenarios other than edge cases. In one example, the baseline driving data 232 may comprise behavioral information about the driver 60 for pulling out of a driveway. In another example, the baseline driving data 232 may comprise behavioral information about the driver 60 for driving down a residential street. In yet another example, the baseline driving data 232 may comprise behavioral information about the driver 60 for driving on a freeway. The type of the driving scenarios 210 used for determining the baseline driving data 232 may be varied according to the design criteria of a particular implementation.

The baseline driving data 232 may be generated by the calibration system 202. Generally, the baseline driving data 232 may be fixed data. For example, the baseline driving data 232 may be generated once by the calibration system 202 and may not be updated afterwards. In some embodiments, the baseline driving data 232 may be re-acquired based on an additional use of the calibration system 202 (e.g., the driver 60 uses the calibration system 202 again after reaching a particular age, after a change in mental capacity, after having children, etc.). In some embodiments, the baseline driving data 232 may be acquired for a particular vehicle (e.g., the driver 60 may have different driving habits when driving a minivan compared to driving a sports car). In some embodiments, the baseline driving data 232 may be captured once and may be re-used when the driver 60 purchases a different vehicle.

The baseline driving data 232 may be stored in response to the signal BASE. The baseline driving data 232 may comprise weights/biases/variables determined in response to the input of the driver 60 provided to the calibration system 202 in response to the driving scenarios 210 (e.g., the signal DRV-IN). The AI module 230 may be configured to analyze the input of the driver 60 in response to the driving scenarios 210 to generate the weights/biases/variables to be stored as the baseline driving data 232. The baseline driving data 232 may be used to generate the personal driving model 234. The baseline driving data 232 may provide default driving behavior for the driving stack 220. For example, the baseline driving data 232 may enable the autonomous driving system 214 to operate the vehicle 50 similar to how the driver 60 would manually operate the vehicle 50 most of the time (e.g., to calibrate the autonomous driving mode to more closely correlate to how the driver 60 drives a vehicle in common driving scenarios).

The personal driving model 234 may comprise information about the preferences of the driver 60 corresponding to all driving scenarios that have been encountered. The personal driving model 234 may be configured to enable a prediction of the preferences of the driver 60 to driving scenarios that have not yet been encountered. The personal driving model 234 may be generated in response to the baseline driving data 232 and/or the edge case parameters 238. The personal driving model 234 may be configured to evolve over time as more data is collected and/or more behaviors of the driver 60 are learned. The personal driving model 234 may be updated by the AI module 230 in response to analyzing the intervention events 236. The personal driving model 234 may be bound by the safeguard data 240. The personal driving model 234 may be used to program the driving stack 220. The personal driving model 234 may be communicated to the driving stack 220 via the signal PDM.

The personal driving model 234 may comprise weights/biases/variables that may be compatible with the driving stack 220. The AI module 230 may be configured to update the weights/biases/variables as new data is collected about the driving behaviors of the driver 60 over time to enable the personalized driving model 234 to evolve over time. Updating the personal driving model 234 may enable the driving behavior of the driver 60 to be captured as the behavior of the driver 60 changes over time. For example, when the driver 60 is younger, the driver 60 may drive more aggressively, which may be captured by the intervention events 236 and used to develop the personal driving model 234. In another example, as the driver 60 ages and/or has children, the driver 60 may start to drive more cautiously, which may be captured by the intervention events 236 and the more cautious behavior may be added to the personal driving model 234. The personal driving model 234 may enable the autonomous driving system 214 to adapt how the vehicle 50 drives when operating autonomously to learn how the driver 60 drives and change over time to better mimic the personal driving style of the driver 60.

The intervention events 236 may comprise data about the driver 60 overriding (e.g., intervening) the autonomous driving system 214. The AI module 230 may be configured to convert various types of data (e.g., video, audio, vehicle sensor data, data from the manual vehicle controls 212, etc.) into a text description. The text description may comprise natural, human-readable text (e.g., plain language). In one example, the intervention events 236 may comprise a database (e.g., a SQLite database with encrypted data entries) comprising the plain text description generated by the AI module 230. The text description may enable the fusion of various types and/or formats of data into a common data type (e.g., text). The AI module 230 may be configured to analyze the text description of the intervention events 236 to determine the edge case parameters 238.

In some embodiments, the intervention events 236 may be generated in response to the driver 60 providing input to the manual vehicle controls 212 while the autonomous driving system 214 is operating the vehicle 50 (e.g., over-riding the autonomous driving system 214 using the signal NAVIN may result in one of the intervention events 236). In some embodiments, the driver 60 may provide audio input in addition to providing the manual vehicle controls 212 and/or without necessarily providing the manual vehicle controls 212. For example, the driver 60 may observe the behavior of the autonomous driving system 214 and, after the vehicle 50 has driven autonomously in a particular scenario, the driver 60 may say "When driving in a school zone, I prefer to go even slower than that". In some embodiments, the intervention events 236 may be generated in response to a request from the autonomous driving system 214. For example, the autonomous driving system 214 may encounter a scenario and determine that the autonomous driving system 214 is uncertain on how to respond to the encountered scenario and request input from the driver 60 (e.g., in response to detecting emergency vehicles, the vehicle 50 may ask "How do you think we should drive near the emergency vehicle"). In one example, the driver 60 may respond verbally (e.g., "Leave a lot of room near the emergency vehicle and drive on the shoulder of the road if you have to"). In another example, the driver 60 may take over driving using the manual vehicle controls 212. In yet another example, the intervention events 236 may be generated in response to input from a remote driver. For example, the vehicle 50 may be configured to be controlled remotely (e.g., by a person providing a safety monitoring service) and the intervention events 236 may be generated when the remote safety agent takes over control of the vehicle 50 remotely. In one example, the personal driving model 234 may be determined for the remote safety agent (e.g., for use across multiple vehicles for a fleet of vehicles providing a robo-taxi service). The types of scenarios that result in the intervention events 236 may be varied according to the design criteria of a particular implementation.

The intervention events 236 may record various data types. For example, when the intervention event is detected, data from the manual vehicle controls 212 may be captured (e.g., provided via the signal INTV). In another example, video data of the intervention event may be captured (e.g., the capture device 104 may provide the signal VIDEO). In yet another example, audio data may be captured. For example, the driver 60 may speak to provide information about the intervention performed. The microphone 188c may capture the voice input from the driver 60 and generate the signal AUDIO. The signal AUDIO may be analyzed by the SoC 204 and/or the AI module 230 for speech-to-text operations. The text of the speech may be analyzed by the AI module 230. The intervention events 236 may comprise timestamp data for each data source (e.g., manual controls, video, audio, etc.) to enable the AI module 230 to determine the driving behavior that corresponds to a particular scenario. The intervention events 236 may further comprise an urgency value (e.g., a level of criticality). The urgency value may be used by the AI module 230 to provide increased or decreased weighting on the driver behavior (e.g., the behavior of the driver 60 may be more significantly weighted during serious/urgent events compared to less serious/urgent events). The video, audio and/or vehicle parameters may be captured as the data for the intervention events 236.

The edge case parameters 238 may comprise information about the preferences of the driver 60 corresponding to the intervention events 236. Generally, the edge case parameters 238 may provide the behavioral preferences of the driver 60 for scenarios other than the most common driving situations (e.g., driving scenarios that may be less common and/or driving scenarios that correspond to the lowest proportion of driving scenarios). For example, the edge case parameters 238 may cover all driving scenarios other than the driving scenarios 210. In one example, the edge case parameters 238 may comprise behavioral information about the driver 60 for making an unprotected left turn onto a multi-lane road. In another example, the edge case parameters 238 may comprise behavioral information about the driver 60 for driving in a multi-lane round-a-bout. In yet another example, the edge case parameters 238 may comprise behavioral information about the driver 60 driving through a construction zone. In still another example, the edge case parameters 238 may comprise behavioral information about the driver 60 driving through locally distinct scenarios (e.g., the Pittsburgh Left, the Michigan Left, a poorly maintained local road, etc.). The type of driving scenarios used for determining the edge case parameters 238 may be varied according to the preferences of the driver 60 (e.g., when the driver 60 intervenes over the autonomous driving system 214).

The edge case parameters 238 may be generated by the AI module 230. Generally, the edge case parameters 238 may evolve over time. For example, the edge case parameters 238 may be generated in response to the AI module 230 learning more and more behaviors and/or tendencies of the driver 60 over time. The learned behavior for the edge case parameters 238 may enable determining how the driver 60 may change over time (e.g., the driver 60 may become more cautious with age). In some embodiments, the edge case parameters 238 may be acquired for a particular vehicle (e.g., the driver 60 may have different driving habits when driving a minivan compared to driving a sports car). In some embodiments, the edge case parameters 238 may be applied to multiple vehicles owned by the driver 60 (e.g., the edge case parameters 238 may be saved as part of a driver profile that may be transferred to different vehicles).

The edge case parameters 238 may comprise weights/biases/variables determined in response to the input of the driver 60 provided to the vehicle 50 in response to intervening while the vehicle 50 may be controlled by the autonomous driving system 214. The AI module 230 may be configured to analyze the input of the driver 60 to the manual vehicle controls 212 to generate the weights/biases/variables to be stored as the edge case parameters 238. The edge case parameters 238 may be used to generate the personal driving model 234. The edge case parameters 238 may be configured to fine-tune the driving behavior for the driving stack 220 provided by the baseline driving data 232. For example, the edge case parameters 238 may enable the autonomous driving system 214 to operate the vehicle 50 similar to how the driver 60 would manually operate the vehicle 50 in various edge cases (e.g., to calibrate the autonomous driving mode to more closely correlate to how the driver 60 drives a vehicle).

The safeguard data 240 may be configured to provide one or more limitations on the personal driving model 234 (e.g., a safeguard calibration range). The safeguard data 240 may prevent the personal driving model 234 from being tuned/ calibrated beyond various guard-bands. The guard-bands may prevent the autonomous driving system 214 from operating outside of various standards (e.g., safety standards) of the vehicle 50. In one example, the safeguards 240 may comprise limitations according to rules/regulations (e.g., even though the driver 60 may regularly manually intervene to speed, the safeguard data 240 may prevent the personal driving model 234 from driving a particular amount over the speed limit). In another example, the safeguard data 240 may comprise limitations according to a design of a vehicle (e.g., the personal driving model 234 may be prevented from behavior that may tip the vehicle 50 over based on the vehicle weight, prevent from behavior that may overheat the vehicle, prevent vehicle 50 from driving fast over water to avoid hydroplaning, etc.). In yet another example, the safeguard data 240 may comprise limitations according to various customs (e.g., avoid cutting ahead in a queue, avoid excessive idling, etc.). The types of behavior that may be limited by the safeguard data 240 may be varied according to the design criteria of a particular implementation.

The video data 242 may be configured to store the video frames generated by the processor 102. The memory 150 may receive the video data after being processed by the processor 102. The video data storage 242 may provide storage for the video frames to be output to a video device (e.g., a monitor) and/or streamed to another device (e.g., a smartphone). In some embodiments, the video data storage 242 may further comprise other raw data captured when the driver 60 intervenes (e.g., the vehicle sensor data, the audio data, the input from the manual vehicle controls 212, etc.). The video data 242 may be used by the AI module 230 to generate the text description of the video frames.

The memory 150 may be configured to store data about the driver 60 and/or other drivers in unique and/or specific driver profiles. Generally, the baseline driving data 232, the personalized driving model 234, the intervention events 236 and/or the edge case parameters 238 may be stored according to a driver profile (e.g., multiple drivers may each have an individual driver profile). Generally, the safeguard data 240 may apply to all driver profiles. Generating and/or storing the data for individual profiles may enable the autonomous driving system 214 to drive the vehicle 50 differently for multiple different drivers according to the preferences of each individual driver. For example, the memory 150 may store a unique driving profile for each member of a family that drives the vehicle 50. In some embodiments, multiple driving profiles may share the same baseline driving data 232 (e.g., a parent may perform the initial calibration using the calibration system 202 to set up the baseline driving data 232 for a child that will be using the vehicle 50). In some embodiments, the same driver may have multiple different profiles depending on particular circumstances. For example, the driver 60 may drive more aggressively when driving alone, or when driving to work, compared to when driving with family members in the vehicle 50 (e.g., the memory 150 may store one driver profile for the driver 60 when alone, and a second driver profile for the driver 60 when a family member is also in the vehicle 50). The number of driving profiles stored may be varied according to the design criteria of a particular implementation.

In some embodiments, the particular driving profile selected for programming the driving stack 220 and/or for generating data for the personalized driving model 234 may be selected manually. For example, the infotainment unit of the vehicle 50 may receive manual input (e.g., using a touchscreen interface) to enable the driver 60 to select their own driving profile. In some embodiments, the particular driving profile selected may be determined automatically (e.g., a smartphone may communicate with the infotainment unit of the vehicle 50 to provide an identification of the driver 60). In some embodiments, computer vision operations performed by the processor 102 may be used to determine the driver 60 (e.g., the field of view 62e may capture an interior of the vehicle 50 and computer vision operations may detect the driver 60 and/or other occupants in the vehicle 50) and the appropriate driver profile may be selected. The method of determining the driver profile based on the occupants in the vehicle 50 may be varied according to the design criteria of a particular implementation.

Figure 4:
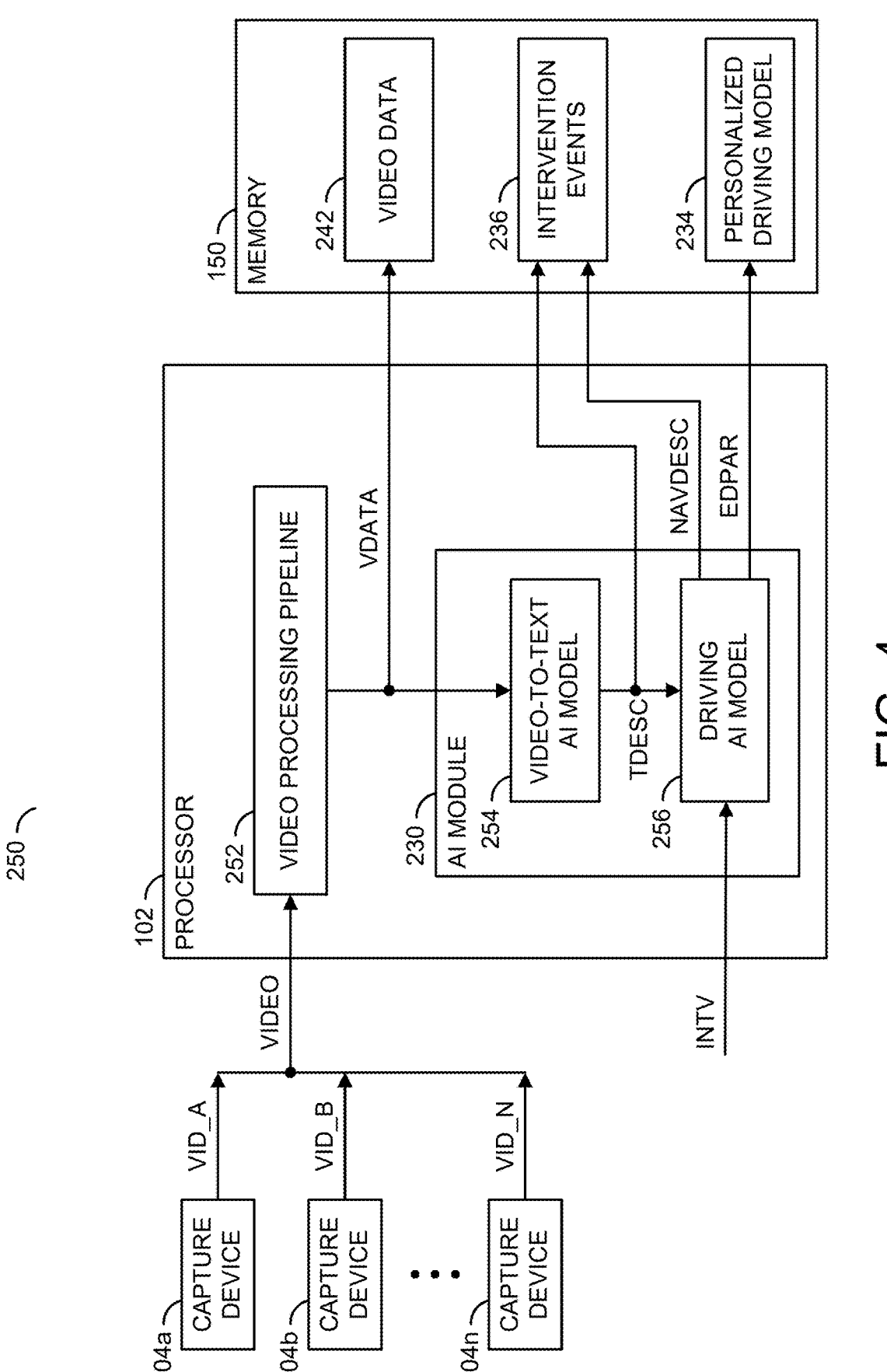
FIG. 4 is a block diagram illustrating a video-to-text AI model and a driving AI model configured to provide auto-calibration for a personalized self-driving experience.

Referring to FIG. 4, a block diagram illustrating a video-to-text AI model and a driving AI model configured to provide auto-calibration for a personalized self-driving experience is shown. A personalization driving system 250 is shown. The personalization driving system 250 may comprise a number of the capture devices 104a-104n, the processor 102 and/or the memory 150. In an example, the personalization driving system 250 may be installed on the vehicle 50.

The capture devices 104a-104n may be implemented by one or more of the camera systems 100a-100n. The capture devices 104a-104n may be configured to capture video data of the environment 40 near the vehicle 50. For example, the capture devices 104a-104n may be configured to generate video data corresponding to the all-around view 62a-62d shown in association with FIG. 1. The video data generated by the capture devices 104a-104n may enable the AI module 230 to determine contextual information about the environment 40 during an intervention event. For example, the video data generated by the capture devices 104a-104n may provide data about a number, size and/or location of other vehicles on the road, a number, size and/or location of pedestrians, the shape of the roadway, distances to various obstacles (e.g., trees, signs, buildings, etc.), roadway information (e.g., signs), road markings (e.g., lane lines, turn lane markers, pedestrian crosswalks, etc.), pothole locations, street light status (e.g., an active light on a street light, pedestrian light indicators, railway crossing status, etc.), weather conditions, etc.

Generally, the capture devices 104a-104n may be configured to capture the environment outside of the vehicle 50. In some embodiments, one or more of the capture devices 104a-104n may be configured to capture video of the driver 60. For example, the field of view 62e, shown in association with FIG. 1 may capture video of the driver 60. Capturing video of the driver 60 and/or other passengers may be used to determine an urgency of the intervention event. For example, the AI module 230 may analyze facial expressions of the driver 60 to determine a reaction of the driver (e.g., scared, angry, surprised, etc.) to determine the urgency of the event. In another example, the AI module 230 may analyze body movements of the driver 60 to determine the urgency of the actions performed by the driver 60 (e.g., fast, exaggerated movements may indicate that the driver 60 is reacting to a dangerous situation). In yet another example, overall movement of the driver 60 may be used to determine the smoothness of the vehicle operation (e.g., the driver 60 swaying back and forth in the seat may indicate that the vehicle behavior is too aggressive). The type of information gathered based an analysis of the driver 60 and/or other occupants for the driving events may be varied according to the design criteria of a particular implementation.

The capture devices 104a-104n may each generate a respective signal (e.g., VID_A-VID_N). The signals VID_A-VID_N may comprise pixel data. The interface 206 may receive each of the signals VID_A-VID_N. For simplicity, the multiple input signals of the pixel data is shown as the signal VIDEO. The signal VIDEO may be provided to the processor 102.

The processor 102 may comprise the AI module 230 and/or a block (or circuit) 252. The circuit 252 may implement a video processing pipeline. The video processing pipeline 252 may be configured to receive the signal VIDEO. The video processing pipeline 252 may be configured to generate a signal (e.g., VDATA). The signal VDATA may comprise the pixel data arranged as video frames. The video processing pipeline 252 may present the signal VDATA to the AI module 230 and/or the memory 150 (for storage).

The video processing pipeline 252 may be configured to receive the pixel data in the signal VIDEO. The video processing pipeline 252 may be configured to process the pixel data arranged as video frames. The signal VDATA may comprise the video frames generated by the video processing pipeline 252. In some embodiments, the video frames generated by the video processing pipeline 252 may comprise encoded video frames. In some embodiments, the video frames generated by the video processing pipeline 252 may comprise raw data that may be used for various types of analysis (e.g., motion detection, object detection, cropping, auto-balance, depth analysis, behavior detection, cropping, stabilization, upscaling, downscaling, dewarping, formatting for an output device, etc.) as described in association with FIG. 2. The video processing pipeline 252 may be configured to prepare the raw pixel data for further analysis by the AI module 230, for communication to other devices and/or for storage in the memory 150. The video data storage 242 may store the video frames generated by the video processing pipeline 252. The memory 150 may receive the signal VDATA from the video processing pipeline 252 and store the video frames as the video data storage 242.

The AI module 230 may comprise a block (or circuit) 254 and/or a block (or circuit) 256. The circuit 254 may implement a video-to-text AI model. The circuit 256 may implement a driving AI model. The AI module 230 may comprise other components and/or AI models. The AI models 254-256 may be implemented by one or more of the hardware modules 190a-190n dedicated to performing AI operations (e.g., hardware configured to perform hardware AI acceleration). The number, type and/or arrangement of the components and/or AI models implemented by the AI module 230 may be varied according to the design criteria of a particular implementation.

The video-to-text AI model 254 may be configured to receive the video data from the signal VDATA. In one example, the video-to-text AI model 254 may be configured to operate on all of the video data (e.g., the signal VDATA). In some embodiments, the processor 102 may comprise other components configured to extract a subset of the video frames from the signal VDATA that corresponds to the intervention event and the subset of the video frames comprising the intervention event may be presented to the video-to-text AI model 254. The video-to-text AI model 254 may be configured to generate a signal (e.g., TDESC). The signal TDESC may be generated by the video-to-text AI model 254 in response to the signal VDATA. The video-to-text AI model 254 may present the signal TDESC to the memory 150 and/or the driving AI model 256.

The video-to-text AI model 254 may be configured to perform an analysis of the video data and generate smart metadata (e.g., a natural text description of the video frames). The smart metadata may be presented in the signal TDESC. The video-to-text AI model 254 may be configured to generate the smart metadata by performing natural language processing and generate natural language text based on learned patterns and/or relationships between words in a particular spoken/written human language. The smart metadata may comprise a full text description of the video frames. The smart metadata may comprise a plain language description of the objects in the video frames, the context of the video frames, the colors in the video frames, the arrangement of the visual elements in the video frames, the behavior of objects in the video frames, the location of objects in the video frames, the types of objects in the video frames, etc.

The smart metadata may be determined based on not only a current video frame, but also previous video frames and later video frames. For example, a single video frame of an object (e.g., a hand) in the air may not provide sufficient information to determine a location and/or behavior of the object. Analyzing the previous and later video frames may provide context to enable the video-to-text AI model 254 to determine behavior such as whether the object in the air is being raised up or falling down. In some embodiments, the smart metadata may provide an initial description (e.g., a best guess) based on the content of the current and previous video frames to provide real-time analysis, and then update the smart metadata as subsequent video frames are analyzed to update the initial description after more context becomes available (e.g., the initial description may describe an object as lifting up, but after subsequent video frames are analyzed, the object may be determined to be falling down). The video-to-text AI model 254 may be configured to determine behaviors of objects in the video frames analyzed. For example, the behavior may comprise a classification of movements of the driver 60 and/or a location of the objects (e.g., the vehicle 50) in response to various objects, behaviors and/or patterns detected. For example, the video-to-text AI model 254 may determine that a video frame comprises a red light, the distance to the red light, the relationship of the red light to an intersection, where the intersection is located with respect to the vehicle 50, whether the red light is applicable to the vehicle 50, etc. The method of describing the contents of the video data may be varied according to the design criteria of a particular implementation.

In one example, the video-to-text AI model 254 may implement a video-to-text AI model. In one example, the AI model implementing the video-to-text analysis may be a transformer network. In another example, the AI model implementing the video-to-text analysis may be performed using a convolutional neural network. Generally, the AI model implementing the video-to-text analysis may be a type of neural network. In one example, the AI model implementing the video-to-text analysis may provide bootstrapping language-image pre-training with frozen image encoders and large language models (e.g., BLIP-2). The AI model may be implemented based on a generic and efficient pre-training strategy that bootstraps vision-language pre-training from off-the-shelf, frozen, pre-trained image encoders and frozen large language models. The AI model may comprise a querying transformer pre-trained with a first stage that bootstraps vision-language representation learning from a frozen image encoder and a second stage that bootstraps vision-to-language generative learning from a frozen language model. In another example, the AI model may be implemented based on a Flamingo80B model. In yet another example, the video-to-text AI model 254 may be a LlaVA model. The AI model implemented by the video-to-text AI model 254 may be configured with emerging capabilities of zero-shot image-to-text generation that may follow natural language instructions. Details of the video-to-text AI model 254 may be described in U.S. patent application Ser. No. 18/210,931, filed on Jun. 16, 2023, appropriate portions of which are incorporated by reference. The type of AI model implemented for video-to-text may be varied according to the design criteria of a particular implementation.

In some embodiments, the driving AI model 256 may be configured to receive the signal TDESC and/or the signal INTV. For example, the driving AI model 256 may determine whether the driving intervention has occurred based on the text description provided by the smart metadata for the video frames and/or input about the driver intervention from the vehicle 50. In some embodiments, the driving AI model 256 may be configured to receive the signal VDATA. For example, the driving AI model 256 may determine whether the driving intervention has been determined by analyzing the video data based on computer vision operations. The driving AI model 256 may be configured to generate a text description of the vehicle sensors, audio input and/or the manual vehicle controls 212. In some embodiments, the driving AI model 256 may be configured to perform speech-to-text operations in response to the signal AUDIO. The driving AI model 256 may present a signal (e.g., NAV-DESC) to the intervention events 236. The signal NAV-DESC may comprise the natural text description of the vehicle sensors, the audio input and/or the manual vehicle controls 212. For example, the driving AI model 256 may be configured to perform sensor fusion-to-text operations (e.g., aggregate sensor readings from multiple disparate sources and convert the aggregated data into human readable text). The driving AI model 256 may enable the intervention events 236 to store a combination of the video-to-text description (e.g., the signal TDESC) and/or the text description of the vehicle sensors, the audio input and/or the manual vehicle controls 212. The driving AI model 256 may present a signal (e.g., EDPAR). The signal EDPAR may comprise the driving behavior parameters that correspond to the intervention event (e.g., the edge case parameters). The signal EDPAR may be stored in the edge case parameters 238 and/or presented to the personalized driving model, 234.

The driving AI model 256 may be configured to perform an analysis for the text description of the intervention events 236. The generation of the edge parameters may be determined in response to the text description of the video data in the signal TDESC and the text description in the signal NAVDESC. The behavior of the driver 60 detected in the video frame and/or the description of objects and/or other details in the video frames (e.g., behavior of the pedestrians and/or other vehicles detected) may be used to determine the driving preferences of the driver 60.

The driving AI model 256 may implement an AI model. The AI model implemented by the driving AI model 256 may be configured to analyze the smart metadata describing the video frames to determine the context of the driving scenario at the time the intervention events 236 occurred. In some embodiments, the AI model implemented by the driving AI model 256 may perform computer vision operations. In one example, the AI model implemented by the driving AI model 256 may implement an ANN such as a convolutional neural network. The driving AI model 256 may be configured to evaluate the behavior of the driver 60. The analysis of the interventions performed and/or why the interventions were performed may be performed based on the objects detected, particular faces detected, behavior of objects detected in the video frames, etc.

In some embodiments, the driving AI model 256 may implement a LLM AI model and/or a LlaVa model that creates a textual description of the event. The LLM AI model and/or the LlaVa model implemented by the driving AI model 256 may be implemented to parse the natural language video description in the signal TDESC and/or convert the sensor data and/or vehicle control input into natural language. The driving AI model 256 may be configured to learn the preferences of each individual driver based on the behavior performed in response to the intervention events 236.

The smart metadata (e.g., the combination of the video-to-text description in the signal TDESC and the text description of the manual vehicle input, the audio, the vehicle sensors, etc. in the signal NAVDESC) may provide a description that may be easily searched and/or mined for useful information about the driving preferences of the driver 60. In one example, the intervention events 236 may comprise a text description that indicates, "the driver entered a two lane round-a-bout and a manual intervention occurred" in response to the signal TDESC and data in the signal INTV. The intervention events 236 may comprise a text description that indicates, "the driver stated that they were uncomfortable entering the round-a-bout at such a high speed to fit between the two vehicles and that I should wait for a larger opening to enter more slowly". The depth and/or level of detail for the text description of either the video-to-text description in the signal TDESC and/or the navigation input description in the signal NAVDESC may vary and/or may be set as a configurable setting for capturing data. In one example, the level of detail for the natural text descriptions may be initialized during a setup before analyzing driving events. In another example, the level of detail for the natural text descriptions may be modified over time (e.g., if more information is beneficial to report for determining the behavior of the driver).

The driver AI model 256 may be configured to search the intervention events 236 to determine the behavior of the driver 60 during particular types of events. For example, by searching the text descriptions in the intervention events 236, the driving AI model 256 may determine whether there are common types of events (e.g., entering two laned round-a-bouts) that result in the driver 60 manually intervening. The driving AI model 256 may be configured to build a baseline from a combination of all the instances of the particular type of intervention when combined with intervention data (e.g., manual navigation input) and/or voice descriptions of what the driver 60 did not like about the behavior of the autonomous driving system 214). Analyzing text-only data may enable the driving AI model 256 to quickly identify patterns in behavior and/or address/modify the behavior by generating the edge case parameters 238. The edge case parameters 238 may be used to develop the personal driving model 234 over time. The personal driving model 234 may be used to update the driving stack 220 with the latest information about the driving preferences of the driver 60.

Figure 5:
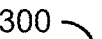
FIG. 5 is a diagram illustrating an example embodiment of a calibration system for determining baseline driving data.

Referring to FIG. 5, a diagram illustrating an example embodiment of a calibration system for determining baseline driving data is shown. An example buck embodiment 300 of the calibration system 202 is shown. The buck embodiment 300 may enable the generation of the baseline driving data 232 before the driver 60 uses the vehicle 50. For example, the buck embodiment 300 may enable offline training for generating the baseline driving data 232.

The buck embodiment 300 of the calibration system 202 may comprise a support frame 302, a seat 304, a headset 306 and/or a computing device 308. A cable 310 is shown connecting the headset 306 to the computing device 308. The buck embodiment 300 may further comprise vehicle inputs. The vehicle inputs may comprise a steering wheel 312, an accelerator pedal 314, a brake pedal 316, a gear shifter 318, a switch stalk 320 and/or a switch stalk 322. In some embodiments, the buck embodiment 300 may comprise a display 330. The design of the buck embodiment 300 may be varied according to the design criteria of a particular implementation.

The support frame 302 may be configured to support the seat 304 with the driver 60, the computing device 308, and/or the various vehicle inputs 312-322. In some embodiments, the support frame 302, the seat 304 and/or the vehicle inputs 312-322 may be implemented to mimic and/or simulate a generic vehicle interior design (for applicability to multiple types of vehicles). In some embodiments, the support frame 302, the seat 304 and/or the vehicle inputs 312-322 may be implemented to mimic and/or simulate the interior design of the vehicle 50. For example, the buck embodiment 300 of the calibration device 202 may be configured to provide an experience similar to being within the vehicle 50. Designing the buck embodiment 300 to be similar to the interior of the vehicle 50 may enable the calibration device 202 to accurately capture how the driver 60 may react while driving the vehicle 50 in a real-world environment.

The computing device 308 may comprise a processing device (e.g., a CPU and/or a GPU) and/or a memory. The processing device may enable the headset 306 to generate video and/or audio that simulates driving the vehicle 50. In one example, the headset 306 may be a VR headset and the computing device 308 may be configured to generate a virtual-reality output (e.g., virtual-reality video frames). The driving scenarios 210 may be stored by the computing device 308. The virtual reality output of the computing device 308 may enable the VR headset 306 to output the driving scenarios 210 to the driver 60. For example, the driver 60 may be presented with a virtual reality driving experience that may take the driver 60 through the various driving scenarios 210 (e.g., lane merging, merging onto a highway from an on-ramp, merging onto a highway off ramp, unprotected left-turns, passing other vehicles, etc.). While the cable 310 is shown connecting the VR headset 306 to the computing device 308, in some embodiments, the VR headset 306 may communicate wirelessly with the computing device 308. In some embodiments, instead of implementing a VR headset 306, the display 330 may be used to display the driving scenarios 210. In some embodiments, the display 330 may enable a technician to provide support while the driver 60 is using the VR headset 306. The output of the driving scenarios 210 to the driver 60 may be varied according to the design criteria of a particular implementation.

The computing device 308 may receive the signal DRV-IN from the vehicle inputs 312-322. The vehicle inputs 312-322 may be laid out on the support frame 302 similar to the manual vehicle controls 212 of the vehicle 50. The vehicle inputs 312-322 may be used to capture how the driver 60 responds to the driving scenarios 210. For example, the steering wheel 312 may capture the directional control, the acceleration pedal 314 may capture how the driver 60 accelerates, the brake pedal 316 may capture how fast the driver 60 applies the brakes and/or attempts to slow down. The gear selector 318 may provide input for a manual transmission. The gear selector 318 may further be used to determine how the driver 60 selects forward/reverse (e.g., for backing into and/or out of parking spaces). The switch stalks 320-322 may be used to determine how the driver uses turn signals, activates the wipers, adjusts the headlights, etc. The various vehicle inputs 312-322 may enable the computing device 308 to capture data about how the driver navigates the driving scenarios 210. For example, the signal DRV-IN captured may be timestamped to enable a correlation of the driver input with a timing of the driving scenarios 210.

The computing device 308 may capture the behavior of the driver 60 via the vehicle inputs 312-322. In some embodiments, the computing device 308 may be configured to generate the baseline driving data 232. For example, the signal BASE may comprise the baseline driving data 232 and may be transmitted to the SoC 204 for storage in the memory 150. In some embodiments, the computing device 308 may capture the driving inputs, and present the time-stamped driver inputs along with the driving scenarios 210 as the signal BASE to the SoC 204 and the AI module 230 may generate the baseline driving data 232. The baseline driving data 232 generated by the buck embodiment 300 of the calibration system 202 may be used as calibration inputs into the driving stack 220.

Figure 6:
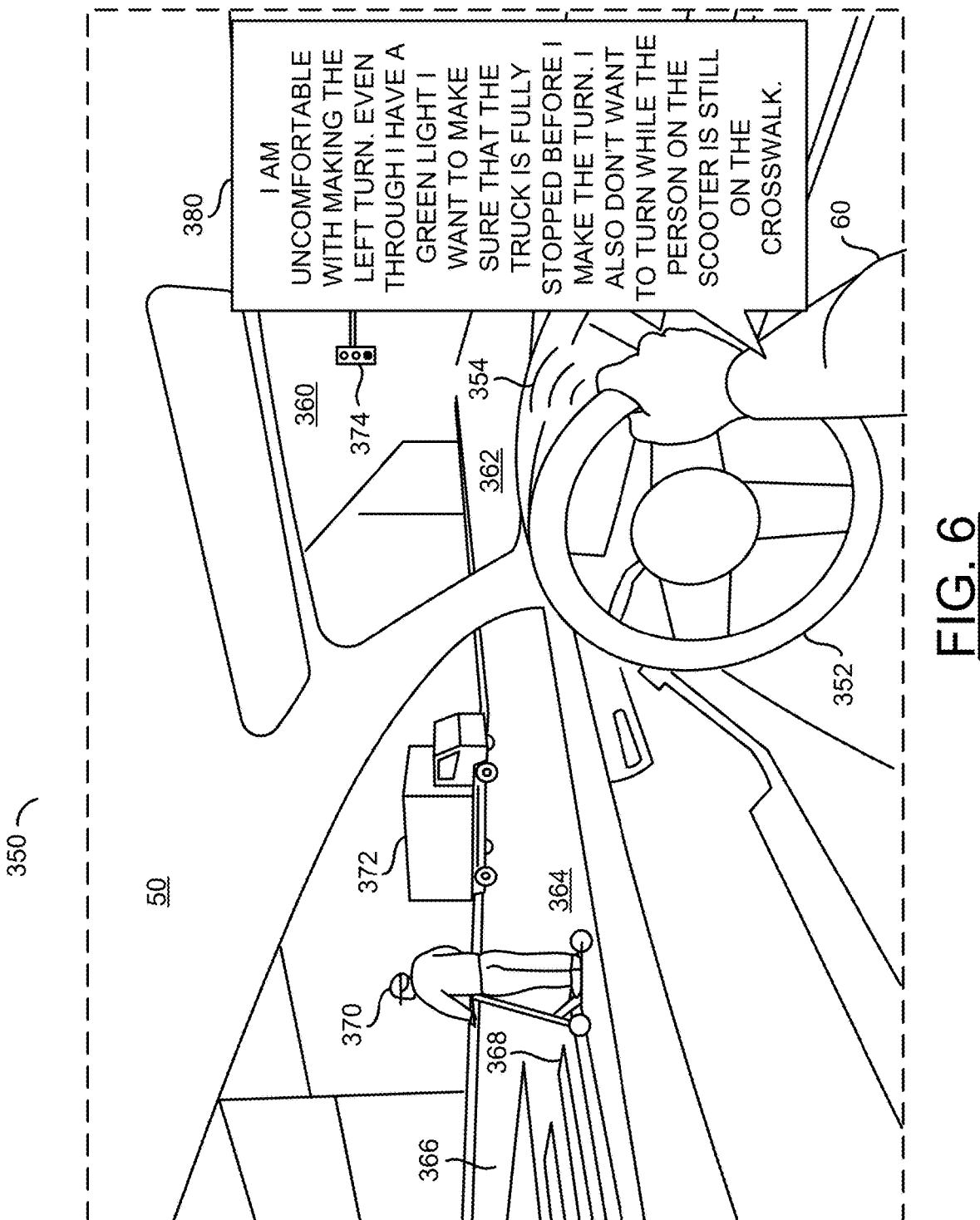
FIG. 6 is a diagram illustrating an example driver intervention event for an unprotected left turn.

Referring to FIG. 6, a diagram illustrating an example driver intervention event for an unprotected left turn is shown. An example driving scenario 350 is shown. The example driving scenario 350 may be provided from a perspective of the driver 60. The example driving scenario 350 may represent a scenario with the vehicle 50 operating autonomously (e.g., driven according to the autonomous driving system 214). The driver 60 may feel uncomfortable with one or more decisions made by the autonomous driving system 214 and/or may intervene, resulting in a driver intervention event.

The example driving scenario 350 may comprise an interior of the vehicle 50. A steering wheel 352 is shown. The steering wheel 352 may be one of the manual vehicle controls 212 for the vehicle 50. The driver 60 is shown (e.g., a hand and arm of the driver 60). The driver 60 may be grabbing the steering wheel 352. Movement lines 354 are shown near the hand of the driver 60. The movement lines 354 may represent a sudden grab and movement of the steering wheel 352 by the driver 60. For example, the autonomous driving system 214 may be controlling the steering wheel 352 to enable the vehicle 50 to drive autonomously and when the driver 60 decides to take over control of the vehicle 50 (e.g., manually intervene), the driver 60 may grab the steering wheel 352 and quickly provide the movement 354 for the manual control (e.g., provide the input NAVIN).

From the perspective of the driver 60 (e.g., through the windshield and driver side window) an environment 360 exterior to the vehicle 50 is shown. The exterior environment 360 may comprise an intersection 362, a road 364 and/or a road 366. The vehicle 50 may be currently driving on the road 364. The vehicle 50 may be at the intersection 362. The vehicle 50 may be attempting to perform a left turn onto the road 366. A crosswalk 368 is shown across the road 364. The road 364 may not have a dedicated turning lane. A scooter rider 370, a truck 372 and/or a street light 374 are shown. The scooter rider 370 may be on the road 364 crossing along the crosswalk 368. The truck 372 may be on the road 366 at the intersection 362. The street light 374 may be facing the vehicle 50. In the example shown, the street light 374 may be a green light, indicating that the vehicle 50 has the right-of-way to enter the intersection 362. The street light 374 may not comprise a turn arrow for making a left turn. For example, the vehicle 50 may be attempting to make an unprotected left turn from the road 364 to the road 366.

The camera systems 100a-100n implemented by the vehicle 50 may be configured to capture pixel data of the exterior environment 360 and/or of an interior of the vehicle 50. The video processing pipeline 252 may be configured to generate video frames in response to the pixel data. The video frames may be analyzed by the video-to-text AI model 254. In some embodiments, the processor 102 (e.g., implementing the CNN module 190b) may perform computer vision operations to detect objects. For example, the processor 102 may be configured to generate a natural text description of the video frames and/or detect objects in the video frames.

Video frames of the exterior environment 360 and/or the interior of the vehicle 50 may be provided in the signal VDATA. In one example, the video frames of the exterior environment 360 may represent a subset of the video frames in the signal VDATA that correspond to the driver intervention event. The video frames may be provided as input to the video-to-text AI model 254 for analysis. The video-to-text performed by the video-to-text AI model 254 may generate the natural text descriptions of the exterior environment 360 for the intervention events 236 in response to the analysis of the video frames. Similarly, the video-to-text performed by the video-to-text AI model 254 may generate the natural text description of the interior of the vehicle 50 (e.g., to indicate the reaction of the driver 60 to determine the driver profile and/or the level of criticality of the driver intervention event). In some embodiments, the video frames may be stored in the memory 150. In some embodiments, the video frames may be discarded after the video-to-text AI model 254 generates the natural text description.

The video-to-text AI model 254 may perform various operations on the pixel data and/or image blocks of the video frames. The video-to-text AI model 254 may be configured to automatically generate natural language descriptions and/or captions for video content. The video-to-text AI model 254 may process raw video frames to extract relevant visual features using deep neural networks (e.g., such as the CNN module 190b and/or recurrent neural networks). The video-to-text AI model 254 may implement a video encoder configured to extract spatio-temporal visual features of the video frames. The video-to-text AI model 254 may implement a language decoder configured to analyze the encoded video features and generates the corresponding text description word-by-word. For example, the video-to-text AI model 254 may be trained on large datasets of videos paired with human-written descriptions to learn the mapping between visual and textual data. The video-to-text AI model 254 may be configured to describe the overall content, actions, and/or context present in the video frames.

Describing the overall content of the video frames may enable the video-to-text AI model 254 to generate the natural text description without necessarily implementing particular types of object detection. In some embodiments, the CNN module 190b may be configured to perform animal detection, household object detection, interior object detection, person detection, vehicle detection, roadway detection, sky region detection, obstacle detection and/or exterior object detection (e.g., the neural network 190b may comprise libraries configured to detect people, vehicles, objects, animals, etc.). In some embodiments, the object detection may be performed in parallel with the video-to-text operations. In some embodiments, the object detection may be performed separately from the video-to-text operations.

The computer vision operations and/or the video-to-text operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. Generally, the behavior, movement direction and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the video-to-text operations may describe the objects of interest in the external environment 360. For example, video-to-text operations may describe the intersection 362, the roads 364-366, the crosswalk 368 in relation to the road 364, the scooter rider 370, the truck 372 and/or the street light 374. The video-to-text operations may be further configured to describe the driver 60 (using the field of view 62e). Many more objects, features and/or behaviors may be detected and/or described (e.g., buildings, plants, animals, people, etc.). In an example, the settings (e.g., the feature set) for the processor 102 (e.g., the computer vision AI neural network model implemented by the CNN module 190b) and/or video-to-text AI model 254 may define objects of interest to be pets, people, signs, dining utensils, tools, vehicles, etc.

The processor 102, the CNN module 190b and/or video-to-text AI model 254 may be configured to implement region, animal, object and/or face detection techniques. In some embodiments, other types of subjects as objects of interest may be detected (e.g., vehicles, traffic lights, street signs, etc.). The computer vision techniques and/or the video-to-text techniques may be configured to detect the regions of interest (ROIs) of the detected objects and/or generate the information about the detected objects and/or the context of the scene generally. The computer vision technique may be looped (e.g., to iteratively perform object/subject detection throughout the video frames) in order to determine if any objects of interest (e.g., as defined by the feature set) are within the field of view of the lens 160 and/or the image sensor 180.

For simplicity, generally the objects of interest may be described as being detected and/or described by the computer vision operations and/or the video-to-text operations performed by the processor 102, the CNN module 190b, and/or the video-to-text AI model 254. However, the object detection and/or video-to-text operations may be configured to detect background objects and/or other types of objects. The background objects may be detected for other computer vision purposes (e.g., training data, labeling, depth detection, etc.) and/or for details for the natural text description. The type(s) of subjects identified as the objects of interest and/or the amount of detail used to describe particular regions of the video frames may be varied according to the design criteria of a particular implementation.

The video-to-text AI model 254 may analyze the video frames to generate the natural text description that may describe the contents of the video data. The video-to-text AI model 254 may analyze the video frames to determine details of the driver intervention event (e.g., to generate an event record for the intervention events 236). The analysis of the details of the driving behavior of the driver 60 may be performed by the driving AI model 256 after the video-to-text operations have been performed on the video frames to generate the natural text description.

In the example context shown, the video-to-text AI model 254 may describe the various objects and/or general details of the exterior environment 360. For example, the video-to-text AI model 254 may describe the arrangement of the roads 364-366 with the intersection 362. The video-to-text AI model 254 may describe the relationship between the crosswalk 368 and the road 364. The video-to-text AI model 254 may further describe the scooter rider 370 on the crosswalk 368 (e.g., location, movement direction, vehicle type, etc.). The video-to-text AI model 254 may describe the truck 372 with respect to the intersection 362. The video-to-text AI model 254 may describe the location and/or status of the street light 374 (e.g., a green light, no arrow, how long the light has been green, etc.). Other details may be described (e.g., the weather, the city environment, the presence of various obstacles, sidewalks, etc.). The amount of detail described for the video frames may be varied according to the design criteria of a particular implementation.

The video-to-text AI model 254 may be configured to generate the intervention event record for the video frames. The natural text description of the video frames may be communicated as the signal TDESC. The data in the signal TDESC may be stored in the intervention events 236. In some embodiments, the natural text description may be initialized based on the detection of the driver intervention (e.g., in response to the wheel grab 354). For example, in response to the manual vehicle controls 212 presenting the signal INTV for the processor 102, the video-to-text AI model 254 may select video frames from a pre-determined amount of time before the intervention was detected and all video frames up until a pre-determined amount of time after the intervention was detected and begin generating the natural text description. In another example, the video-to-text AI model 254 may be configured to generate the natural text description of all the video frames captured in real time along with a timestamp (e.g., the timestamp may be used to correlate the video frames to the time that the driver 60 performed the wheel grab 354 as the beginning of the driver intervention event). Generally, the natural text description may comprise a description for each of the video frames and/or a group (or sequence) of video frames that comprise the driver intervention event. The amount of video frames before the actual intervention (e.g., the wheel grab 354, in the example shown) that may be used to provide context for the driver intervention event may be varied according to the design criteria of a particular implementation.

A speech bubble 380 is shown. The speech bubble 380 may provide a visual representation of speech by the driver 60. For example, the microphone 188c may capture audio input and present the signal AUDIO to the processor 102. In some embodiments, the video-to-text AI model 254 may be configured to perform audio-to-text operations along with the video-to-text operations. In some embodiments, the AI module 230 may further comprise an audio-to-text AI model to generate a transcription of audio along with timestamps (e.g., to correlate the audio transcription with the timestamps of the natural text description of the video frames). In the example shown, the text in the speech bubble 380 may comprise, "I am uncomfortable with making the left turn. Even though I have a green light, I want to make sure that the truck is fully stopped before I make the turn. I also don't want to turn while the person on the scooter is still on the crosswalk". The driver 60 may perform the driver intervention (e.g., the wheel grab 354) and then explain why they felt the need to intervene. The audio explanation may provide context for the scenario and/or provide an additional data point for the driving AI model 256 to determine the edge case parameters 238 (e.g., learn the driving behavior of the driver 60). The audio transcription may be provided as part of the signal TDESC and stored in the intervention events.

The driving intervention event record may comprise the natural language text description of the video data. In the example shown, the video-to-text natural description may be, "Our vehicle is stopped at an intersection. There are two roads that each have two lanes that form a right-angle intersection. The time is 5:36p.m. on a clear, sunny day on May 28, 2024. The intersection is in an urban environment with tall buildings. There is light pedestrian traffic and the roads are relatively empty. There is a crosswalk on the road in front of our vehicle. A truck is waiting to the left of our vehicle. The truck is stopped at the intersection. There is a person wearing a hat and driving a scooter on the crosswalk. The person on the scooter has not yet reached the sidewalk. There is a street light in front of us. The light is green, indicating that our vehicle can enter the intersection. The light does not provide any arrows.". Generally, the natural text description from the video-to-text operations may not be able to determine the intention of the driver 60 from the video data alone (e.g., the natural text description generated by the video-to-text AI model 254 may not know whether the driver 60 is attempting to turn left from the video alone). The natural text described may be an example. The natural text description for the event record may comprise a different style of language. In one example, the natural description may be artful. In another example, the natural description may be utilitarian language. The style of the natural text description may be varied according to the design criteria of a particular implementation.

In response to detecting the manual input from the manual vehicle controls 212, the driving AI model 256 may determine the behavior of the driver 60 and/or determine the details of the driving intervention event. The driving AI model 256 may be configured to analyze the natural text description in the signal TDESC. Based on the analysis of the natural text description in the signal TDESC, the driving AI model 256 may develop an understanding of the driving scenario. The signal TDESC may further comprise the transcription of the signal AUDIO. Based on the analysis of the natural text description comprising the comments by the driver 60, the driving AI model 256 may determine the intentions of the driver 60 and/or the reasons why the driver 60 intervened. The driving AI model 256 may further receive the signal INTV comprising the data about the input provided by the driver 60 to the manual vehicle controls. For example, the details of the wheel grab 354 and/or further interventions performed by the driver (e.g., brake input, accelerator input, a sequence of steering maneuvers, an activation of a turn signal, other vehicle sensor input, etc.) may be received and/or analyzed by the driving AI model 256. For example, the driving AI model 256 may be configured to perform sensor and/or data fusion to aggregate and/or coherently combine various data sources.

The driving AI model 256 may be further configured to generate a text description of the vehicle sensors and/or the manual input provided in the signal INTV. The data in the signal INTV may further comprise details of the actions performed by the autonomous driving system 214. For example, the driving AI model 256 may generate a text description combining the maneuvers performed by the autonomous driving system 214 and/or the manual intervention data in the signal INTV such as, "When the autonomous driving system detected a green light, our vehicle was driven forwards to make a left turn. Since no traffic was detected, the turn was performed quickly. The driver pressed on the brake pedal and grabbed the steering wheel to prevent the turn. After waiting 10 seconds, the driver slowly pressed the accelerator and turned the steering wheel to the left". In the example description, the 10 second wait may correspond to an amount of time that the scooter rider 370 took to exit the crosswalk 368. The description of the vehicle sensors, the autonomous driving system 214 and/or the manual input INTV may be presented to the intervention events 236 as the signal NAVDESC. The natural text described may be an example. The natural text description for the event record may comprise a different style of language. In one example, the natural description may be artful. In another example, the natural description may be utilitarian language. The style of the natural text description may be varied according to the design criteria of a particular implementation.

The driver intervention events stored in the intervention events 236 may be generated and/or updated by the driving AI model 256. The event records may correspond to a fusion of the sequence of video frames and/or other sensor data used to analyze the environment 360 and/or the inputs to the vehicle 50 during the event. For example, the intervention events 236 may comprise a combination of the natural text description (e.g., from audio and video) in the signal TDESC and the natural text description (e.g., from the vehicle sensors, the autonomous driving system 214 and/or the manual vehicle input INTV) in the signal NAVDESC. The intervention event records may comprise sensor information. For example, the intervention event record may describe the camera ID and/or sensor ID of the sensors 188a-188n that captured the event (e.g., if a subset of the sensors 188a-188n captured the event while others did not). In an example, a camera ID number/label may be used to identify the particular one of the capture devices 104a-104n that captured the event. The event records may comprise timestamp information indicating when the event started, when the event ended and/or the length of the event (e.g., the event started at 1p.m. and lasted for 10 seconds). In some embodiments, the event records may store frame ID information for the sensors 188a-188n (e.g., for scenarios where all of the sensor data is stored to correlate the text description to the sensor data). In some embodiments the driving AI model 256 may be configured to combine the natural text description in the signal TDESC and the signal NAVDESC to provide a more coherent description of the intervention event (e.g., re-write the natural text descriptions based on the contextual information from the various data sources). For example, the natural text description of waiting for 10 seconds before pressing the accelerator may not provide context, but when combined with the video data of the scooter rider 370 taking 10 seconds to reach the sidewalk and the driver 60 stating they were waiting for the scooter rider 370 may enable a combined natural text description of the event (e.g., "The driver held the brake for 10 seconds until the scooter rider reached the sidewalk and then pressed the accelerator to complete a turn onto Main St.").

The description for the event records may be generated in response to the outcome analysis performed by the driving AI model 256. For example, the description may describe the video contents and/or other sensor data with sufficient detail that the source video frames may no longer be beneficial to understanding the video contents. For example, the description may provide a human readable description of the contents of the video frames with sufficient detail to enable the visually impaired to understand the contents of the video frames (e.g., using a screen reader). The description may further comprise content acquired from the sensors 188a-188n that do not provide video content. The data from the sensors 188a-188n and/or the source data about the manual intervention may be discarded once the natural text description has been stored. The level of detail and/or the granularity of the description may be adjustable. The amount of text, the type of description and/or the information stored as the event record may be varied according to the design criteria of a particular implementation.

The driving AI model 256 may be configured to analyze the event records stored in the intervention events 236. In response to the analysis of the combined natural text of the driving intervention event records, the driving AI model 256 may determine the behavior of the driver 60 in particular driving scenarios. In the example shown, the driver behavior may be in the context of making an unprotected left turn and/or navigating an intersection with a crosswalk. The driving AI model 256 may be configured to generate the edge case parameters 238 in response to the analysis of the driving intervention event detected. In some embodiments, the edge case parameters 238 may be applied generally (e.g., to determine a general driver aggression behavioral adjustment). In some embodiments, the edge case parameters 238 may be applied specifically to the driving scenario detected (e.g., for the particular edge case of performing an unprotected left turn). How the edge case parameters 238 are applied by to the overall behavior of the driver 60 may be varied according to the design criteria of a particular implementation.

The driving AI model 256 may apply the edge case parameters 238 to the personalized driving model 234. For example, the driving AI model 256 may present the signal EDPAR to update the personalized driving model 234. After the personalized driving model 234 has been updated, the updated personalized driving model 234 may be programmed into the driving stack 220.

Figure 7:
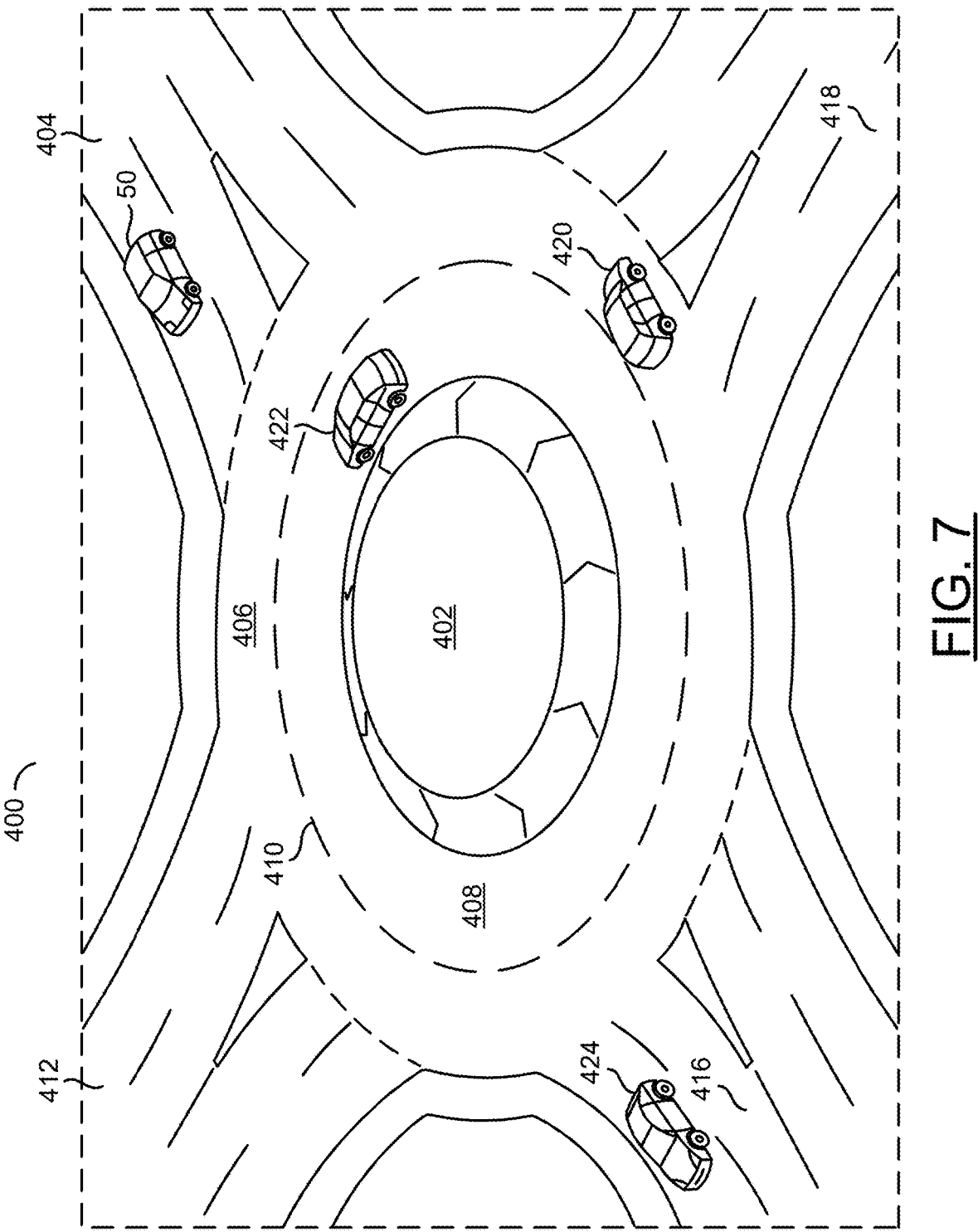
FIG. 7 is a diagram illustrating an example driver intervention event for a round-a-bout.

Referring to FIG. 7, a diagram illustrating an example driver intervention event for a round-a-bout is shown. A driving scenario 400 is shown. The driving scenario 400 may comprise a bird's eye view of a round-a-bout 402. For example, the driving scenarios 210 may cover general driving scenarios that may be commonly encountered. Navigating the round-a-bout 402 may be an example of an edge case.

The vehicle 50 implementing the processor 102 is shown on a road 404 for entering the round-a-bout 402. The round-a-bout may be a two-lane round-a-bout. The round-a-bout 402 may comprise an outer lane 406 and an inner lane 408. A lane marker 410 is shown in the round-a-bout separating the outer lane 406 from the inner lane 408. The round-a-bout may comprise four exit/entrance roads. The vehicle 50 may be at one road 404 and may have the option to exit the round-a-bout 402 at the road 412, the road 416 or the road 418. A vehicle 420 is shown in the outer lane 406 of the round-a-bout 402 near the road 418. A vehicle 422 is shown in the inner lane 408 of the round-a-bout 402 near the road 404. A vehicle 424 is shown exiting the round-a-bout at the road 416.

The two-lane round-a-bout 402 may be an example of an edge case that may not be covered by the driving scenarios 210. The baseline driving data 232 for the driving stack 220 may not provide particular data for navigating the two-lane round-a-bout 402. In some embodiments, the autonomous driving system 214 may attempt to navigate the round-a-bout 402 based on generalized driving behavior from the baseline driving data 232 (e.g., based on data indicating the driver 60 generally prefers to drive aggressively/cautiously). In some embodiments, the autonomous driving system 214 may not attempt to enter the round-a-bout 402 and instead ask the driver 60 to manually intervene. In scenarios where the autonomous driving system 214 does not attempt the driving scenario and/or asks the driver 60 to intervene, one of the driving intervention events may be initiated to enable learning the behavior of the driver 60 for the particular driving scenario.

The video-to-text AI model 254 may generate the natural text description of the driving scenario. For example, the natural text description of the video may comprise, "Our vehicle is waiting at the entrance to a round-a-bout. The round-a-bout has two lanes and four exits. A red vehicle is in the inner lane of the round-a-bout almost in front of our vehicle. It is unlikely that our vehicle could enter the round-a-bout in the inner lane without first waiting for the red vehicle. A blue vehicle is in the outer lane of the round-a-bout. The blue vehicle is to the left of our vehicle and approaching our vehicle. There is sufficient time for our vehicle to enter the outer lane ahead of the blue vehicle if we accelerate quickly." The natural text description of the video may be stored in the driver intervention events 236. In some embodiments, a natural text description of all the video frames may be generated in real-time and stored as part of the intervention events 236 (e.g., all video data may be converted to text as a matter of course). In some embodiments, the driving AI model 256 may later analyze the natural text descriptions stored in the intervention events 236 to determine whether the data may be relevant to a manual intervention. If the natural text description is determined not to be relevant to a manual intervention, the natural text description may be discarded.

In one example, the autonomous driving system 214 may attempt to navigate the round-a-bout 402 based on the baseline driving data 232 and/or other data in the personal driving model 234 that may be suitable to apply to the current driving scenario. For example, if the general behavior of the driver 60 is to drive aggressively, the autonomous driving system 214 may attempt to enter the round-a-bout 402 in the outer lane 406 (e.g., cut in front of the vehicle 420). If the driver 60 does not intervene, then the personal driving model 234 may be updated to reinforce the aggressive driving behavior of the driver 60. In some embodiments, the driving AI model 256 may detect an uncommon driving scenario (e.g., based on the natural text description of the video data and/or natural text description of the data generated by the autonomous driving system 214 that may be generated, as a matter of course, without a particular input/prompt). The driving AI model 256 may determine that the driver 60 accepted the behavior of the autonomous driving system 214 for the particular driving scenario of the two-lane round-a-bout (e.g., a scenario that was previously unknown) and update the edge case parameters 238. The personal driving model 234 may be updated to incorporate the preferences of the driver 60 when navigating a two-lane round-a-bout (to provide more specific data for the autonomous driving system 214 to work from the next time a two-lane round-a-bout is encountered).

In another example, the autonomous driving system 214 may not attempt to navigate the two-lane round-a-bout 402. The autonomous driving system 214 may request a manual intervention by the driver 60. The driver 60 may use the manual vehicle controls 212 to navigate the round-a-bout 402. For example, the driver 60 may manually control the vehicle 50 and wait for the vehicle 422 and the vehicle 420 to pass before entering the outer lane 406 of the round-a-bout 402. The intervention by the driver 60 may be used by the driving AI model 256 to update the personal driving model 234. The video-to-text AI model 254 may generate the natural text description of the video frames of the vehicle 50 navigating the round-a-bout 402. If the driver 60 provides an audio description, then the audio transcript may be added to the natural text description of the video in the signal TDESC. The driving AI model 256 may receive the signal INTV comprising the data from the vehicle sensors and/or the manual input provided to the manual vehicle controls 212. The driving AI model 256 may convert the vehicle sensors and/or manual input to the manual vehicle controls 212 to the natural text description in the signal NAVDESC. The combined natural text descriptions in the signals TDESC and NAVDESC may be stored as one of the intervention events 236. The driving AI model 256 may analyze the combined natural text of the signals TDESC and NAVDESC to determine the driving behavior of the driver 60 for navigating the two-lane around-about driving scenario. The driving AI model 256 may generate the edge case parameters 238 and update the personal driving model 234 to incorporate the preferences of the driver 60 when navigating a two-lane round-a-bout. For example, the next time the autonomous driving system 214 encounters a two-lane around-a-bout, the autonomous driving system 214 may autonomously navigate the driving scenario without asking the driver 60.

In yet another example, the autonomous driving system 214 may attempt to navigate the round-a-bout 402 based on the baseline driving data 232 and/or other data in the personal driving model 234 that may be suitable to apply to the current driving scenario. For example, if the general behavior of the driver 60 is to drive aggressively, the autonomous driving system 214 may attempt to enter the round-a-bout 402 in the outer lane 406 (e.g., cut in front of the vehicle 420). The driver 60 may react to the behavior selected by the autonomous driving system 214 by manually intervening. In one example, if the autonomous driving system 214 waits for the vehicle 420, the driver 60 may over-ride by attempting to cut in front of the vehicle 420 (e.g., drive aggressively). In another example, if the autonomous driving system 214 attempts to cut in front of the vehicle 420, the driver 60 may over-ride by stepping on the brakes and waiting for the vehicle 420 to pass before entering the outer lane 406. The intervention by the driver 60 may be used by the driving AI model 256 to update the personal driving model 234. The video-to-text AI model 254 may generate the natural text description of the video frames of the vehicle 50 navigating the round-a-bout 402. If the driver 60 provides an audio description, then the audio transcript may be added to the natural text description of the video in the signal TDESC. The driving AI model 256 may receive the signal INTV comprising the data from the vehicle sensors and/or the manual input provided to the manual vehicle controls 212. The driving AI model 256 may convert the vehicle sensors and/or manual input to the manual vehicle controls 212 to the natural text description in the signal NAVDESC. The combined natural text descriptions in the signals TDESC and NAVDESC may be stored as one of the intervention events 236. The driving AI model 256 may analyze the combined natural text of the signals TDESC and NAVDESC to determine the driving behavior of the driver 60 for navigating the two-lane around-about driving scenario. The driving AI model 256 may generate the edge case parameters 238 and update the personal driving model 234 to incorporate the preferences of the driver 60 when navigating a two-lane round-a-bout. For example, the next time the autonomous driving system 214 encounters a two-lane around-a-bout, the autonomous driving system 214 may autonomously navigate the driving scenario without asking the driver 60.

Figure 8:
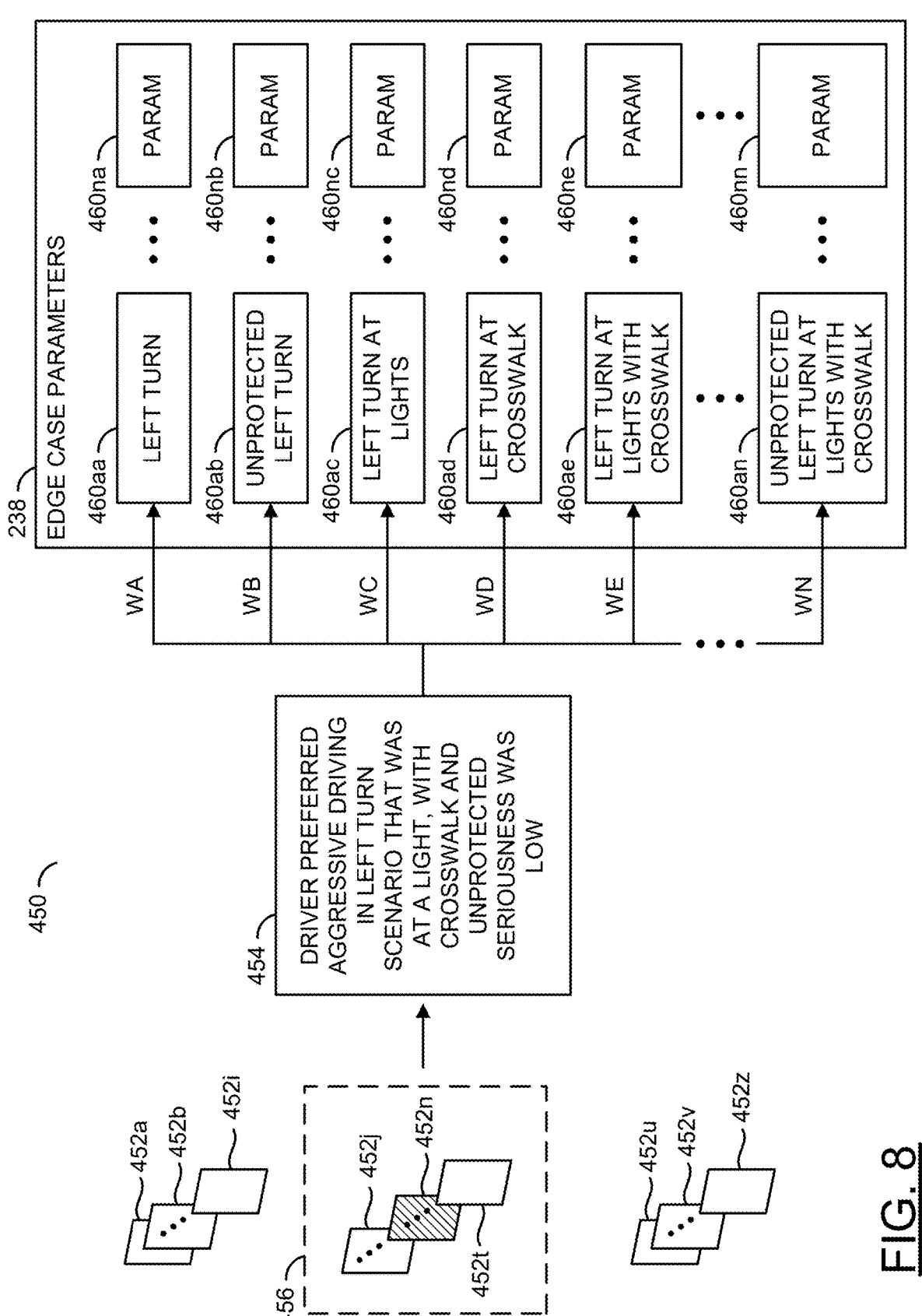
FIG. 8 is a diagram illustrating an example update of edge case parameters in response to video-to-text analysis.

Referring to FIG. 8, a diagram illustrating an example update of edge case parameters in response to video-to-text analysis is shown. An edge case parameter update example 450 is shown. The edge case parameters update example 450 may comprise the edge case parameters 238, video frames 452a-452z, a video-to-text description 454 and/or a driver intervention event 456.

The video frames 452a-452z may comprise a number of video frames. The video frames 452a-452z may be generated by the video processing pipeline 252. For example, the video frames 452a-452z may be provided in the signal VDATA. The video frames 452a-452z may comprise pixel data arranged as video frames. In some embodiments, the video frames 452a-452z may be encoded to a particular format. In one example, the video frames 452a-452z may be encoded in the H.264 format. In another example, the video frames 452a-452z may be encoded in the H.265 format. In yet another example, the video frames 452a-452z may be encoded in the AV1 format. The size and/or number of the video frames 452a-452z may be determined according to a frame-rate and/or resolution of the video data generated by the camera systems 100a-100n. In one example, the video frames 452a-452z may be a 1280×720 resolution at 60 fps. In another example, the video frames 452a-452z may be a 1920×1080 resolution at 60 fps. In yet another example, the video frames 452a-452z may be a 4k resolution at 30 fps. In still another example, the video frames 452a-452z may be an 8k resolution at 30 fps. The video frames 452a-452z may further comprise audio data (e.g., an audio track) and/or metadata (e.g., resolution information, camera ID information, camera make/model information, GPS data, time-stamps, etc.). In some embodiments, the video frames 452a-452z may comprise raw video frame data configured to be operated on by the AI module 230. The type, size and/or format of the video frames 452a-452z in the video stream captured may be varied according to the design criteria of a particular implementation.

In some embodiments, the video-to-text AI model 254 may generate the video-to-text description 454 in response to all of the video frames 452a-452z. In some embodiments, the video-to-text description 454 may be generated by the video-to-text AI model 254 in response to a driver intervention event. The driver intervention event 456 is shown as a dotted box around a subset of the video frames 452a-452z. The subset of the video frames 452a-452z that correspond to the driver intervention event 456 may be the video frames 452j-452t.

In the example shown, the video frame 452n may be the video frame that corresponds to the driver intervention event. For example, the driver 60 may have initiated the driver intervention event at the time the video frame 452n was captured. For example, driving AI model 256 may have identified the video frame 452*n* as matching the timestamp of the driver intervention and/or the driver input (e.g., the signal NAVIN) provided to the manual vehicle controls 212. In the example shown in association with FIG. 6, the video frame 452*n* may match the moment that the driver 6 performed the wheel grab 354. In one example, the signal INTV may comprise a timestamp that may identify a particular one of the video frames 452*a*-452*z* as corresponding to the driver intervention event. In another example, the video frames 452*a*-452*z* and/or the text description TDESC may comprise a metadata entry that may identify a particular one of the video frames 452*a*-452*z* as corresponding to the driver intervention event. The method of identifying the video frame 452*n* as the video frame corresponding to the driver intervention event may be varied according to the design criteria of a particular implementation.

The driver intervention event 456 may comprise the video frame 452*n*. The driver intervention event 456 may comprise video frames 452*j*-452*m* generated before the video frame 452*n*. The driver intervention event 456 may comprise video frames 4520-452*t* generated after the video frame 452*n*. The driver AI model 256 may select some of the video frames 452*a*-452*m* from before the video frame 452*n* and/or some of the video frames 4520-452*z* from after the video frame 452*n* for extraction and deep analysis for the driver intervention event 456. The driver intervention event 456 may comprise at least the video frame 452*n* and some of the video frames 452*a*-452*z* generated prior to and/or generated after the video frame 452*n*.

As a representative example, the video frames 452*a*-452*i* and the encoded video frames 452*u*-452*z* are shown outside of the video sequence selection for the driver intervention event 456 and the video frames 452*j*-452*t* may be the video frames within the video sequence selection for the driver intervention event 456. In the example shown, a subset of the sequence of the video frames 452*a*-452*m* that immediately preceded the video frame 452*n* (e.g., the video frames 452*j*-452*m*) and a subset of the sequence of the video frames 4520-452*z* that immediately succeeded the video frame 452 (e.g., the video frames 4520-452*t*) have been selected as part of the driver intervention event 456. In one example, the video frames 452*a*-452*z* that may be included with the video frame 452*n* may be a particular number of video frames regardless of the framerate (e.g., the first one thousand encoded video frames before and the first thousand video frames after the video frame 452*n*). In another example, the video frames 452*a*-452*z* that may be included with the video frame 452*n* may be within a particular time range (e.g., thirty seconds of video before and thirty seconds of video after the video frame 452*n*). In still another example, the video frames 452*a*-452*z* that may be included with the video frame 452*n* may be a sampling of the video frames 452*a*-452*z* (e.g., a selection of video frames at a lower framerate to provide a sampling of video data for a timelapse sequence before and/or after the matching video frame 452*n*, such as one video frame every second). The number of the video frames 452*a*-452*z* and/or the method of selecting the encoded video frames 452*a*-452*z* to include with the encoded video frame 452*n* in the driver intervention event 456 may be varied according to the design criteria of a particular implementation.

The driving AI model 256 may generate the video-to-text description 454 in response to the driver intervention event 456. For example, the driving AI model 256 may incorporate data from the signal INTV, the description of the video frames 452*j*-452*t* by the video-to-text AI model 254 (e.g., from the signal TDESC) and/or sensor fusion data from other sensors to generate the video-to-text description 454 of the driver intervention event 456. In the example shown, the video-to-text description 454 may comprise the text, "Driver preferred aggressive driving in left turn scenario that was at a light, with crosswalk and unprotected, seriousness was low". The example text shown for the video-to-text description 454 may comprise a representative example of a natural text description for the driver intervention event 456. Generally, the video-to-text description 454 may comprise more granular details than shown in the example text. In the example shown, the video-to-text description 454 may describe that the driver preferred aggressive driving in a left turn scenario. The video-to-text description 454 example further provided details that the left turn scenario was for a cross walk and was an unprotected left turn. For example, the video-to-text description 454 may generally correspond to the example driving scenario 350 shown in association with FIG. 6. However, the particular video-to-text description 454 may vary according to the design criteria of a particular implementation.

The edge case parameters 238 may comprise a number of blocks (or modules) 460*aa*-460*nn*. The blocks 460*aa*-460*nn* may comprise various parameters. The parameters 460*aa*-460*nn* may be configured to store edge case data according to various driving scenarios (e.g., driving scenario parameters). In an example, the parameters 460*aa*-460*nn* may each comprise vector data that may represent a particular weight value for each of the edge case driving scenarios. The driving scenarios defined by the parameters 460*aa*-460*nn* may be used to update the personalized driving model 234. Generally, the parameters 460*aa*-460*nn* may correspond to driving scenarios that may not be associated with the driving scenarios 210 used to define the baseline driving data 232. For example, the parameters 460*aa*-460*nn* combined with the baseline driving data 232 may be used to determine the personal driving model 234. In some embodiments, the parameters 460*aa*-460*nn* may comprise a pre-defined number of edge case driving scenarios. In some embodiments, a number of the parameters 460*aa*-460*nn* may be a dynamic value that may increase as new and/or more granular edge case driving scenarios are detected. The number and/or type of the parameters 460*aa*-460*nn* may be varied according to the design criteria of a particular implementation.

In the example shown, the parameters 460*aa*-460*an* may comprise specific parameters. For example, the parameter 460*aa* may correspond to a 'left turn', the parameter 460*ab* may correspond to a 'unprotected left turn', the parameter 460*ac* may correspond to a 'left turn at lights', the parameter 460*ad* may correspond to a 'left turn at crosswalk', the parameter 460*ae* may correspond to a 'left turn at lights with crosswalk' and the parameter 460*an* may correspond to a 'unprotected left turn at lights with crosswalk'. In the example shown, each of the parameters 460*aa*-460*an* may comprise a description of an edge case driving scenario at different levels of granularity that corresponds to a left turn. For example, the left turn 460*aa* may be a broad left turn scenario, the left turn at lights 460*ac* may be a particular type (or subset) of left turn scenario (e.g., left turn plus street lights) and the unprotected left turn at lights with crosswalk 460*an* may be a narrow (or specific) left turn scenario (e.g., left turn plus unprotected, plus street lights, plus crosswalk). In some embodiments, a broad category, such as the left turn 460*aa* may be part of the baseline driving data 232 that may be covered by the driving scenarios 210, instead of one of the parameters 460*aa*-460*nn*. The particular granularity of the driving scenarios that may correspond to the edge case driving scenarios for the parameters 460aa-460nn may be varied according to the design criteria of a particular implementation.

The driving AI model 256 may determine the particular edge case driving scenario(s) that may correspond to the video-to-text description 454. For example, the driver intervention event 456 described by the video-to-text description 454 may correspond to more than one of the edge case driving scenarios. The driving AI model 256 may determine a weight value to apply to the particular edge case scenario(s) described in the video-to-text description 454. The weight values may be used to update one or more of the parameters 460aa-460nn in the edge case parameters 238. The particular number of the edge case scenarios and/or the weight values applied based on the video-to-text description 454 for each driver intervention event 456 may be varied according to the design criteria of a particular implementation.

In the example shown, the video-to-text description 454 may comprise the text that describes a left turn scenario. In particular, the video-to-text description 454 may describe a left turn scenario (turning from the road 364 to the road 366), that comprises the street lights 374, and also comprises the crosswalk 368. The video-to-text description 454 describes that the driver preference may be aggressive driving. The video-to-text description 454 may describe the seriousness (or level of criticality) to be low. Based on the various combination of driving scenarios in the video-to-text description 454, the particular style of driving and/or the level of criticality described, the driving AI model 256 may determine weight values. Signals (e.g., WA-WN) are shown as input to the edge case parameters 238. The signals WA-WN may comprise the weight values generated by the driving AI model 256 based on the video-to-text description 454.

In the example shown, the weight value signals WA-WN may be presented to the parameters 460aa-460an (e.g., the parameters that correspond to the various left turn scenarios). Since the other parameters 460ba-460nn may not correspond to the particular driving scenarios described in the video-to-text description 454, the weight values WA-WN may not be presented to the other parameters 460ba-460nn. For example, the other parameters 460ba-460nn may correspond to other edge case driving scenarios (e.g., various right turn scenarios, tailgating scenarios, off-road driving, parallel parking scenarios, entering/exiting driveways, etc.).

In some embodiments, the weight value signals WA-WN may comprise different values determined by the driving AI model 256 depending on how closely the parameters 460aa-460an match the particular driving scenario(s) described by the video-to-text description 454 (e.g., the driving AI model 256 may determine a level of precision that the parameters 460aa-460nn match the intervention event(s)). In one example, the weight value WA may be a smaller value than the value WN since the left turn parameter 460aa may generally match the driving scenario described in the video-to-text description 454 while the unprotected left turn at lights with crosswalk parameter 460an may more precisely match the driving scenario described in the video-to-text description 454. Similarly, in another example, the weight value WB for the unprotected left turn parameter 460ab, the weight value WC for the left turn at lights parameter 460ac and the weight value WD for the left turn at the crosswalk 460ad may comprise a higher weight value than the weight value WA since each of the parameters 460ab-460ad may more precisely (or narrowly) describe the driving scenario compared to the broad left turn parameter 460aa, but may also be a smaller value than the weight value WN since the parameters 460ab-460ad may less precisely describe the scenario than the unprotected left turn at lights with crosswalk parameter 460an. Similarly, in yet another example, the weight value WE may be larger than the weight values WB-WD (and the weight value WA), but may be smaller than the weight value WN since the left turn at lights with crosswalk parameter 460ae may be more precise than the parameters 460ab-460ad but less precise than the unprotected left turn with crosswalk parameter 460an. In still another example, if the video-to-text description 454 further describes the left turn, at lights, with a crosswalk and with the scooter rider 370, and none of the parameters 460aa-460nn precisely describes the driving scenario of the driver intervention event 456, then the driving AI model 256 may add a new one of the parameters 460aa-460nn to precisely describe the driving scenario of the driver intervention event 456 (e.g., unprotected left turn at lights with crosswalk and a scooter rider/pedestrian). The particular weighting for the various parameters 460aa-460nn by the driving AI model 256 may be varied according to the design criteria of a particular implementation.

The weight values WA-WN generated by the driving AI model 256 may apply to one or more of the parameters 460aa-460nn. In some embodiments, one type of driving behavior detected may apply to many of the parameters 460aa-460nn, but not necessarily all of the parameters 460aa-460nn. For example, there may be too much variability in opinions (or level of comfort) to apply a general modification from a driving scenario detected to all of the parameters 460aa-460nn. Presenting the driver 60 with a particular number (e.g., a top ten) of challenging scenarios up front during the initial calibration scenarios 210 in the calibration system 202 may be used to generally define parameters for the baseline driving data 232. For example, the calibration system 202 may be configured to have the driver 60 rank the driving scenarios 210 in terms of a level of angst/consternation/uncomfortableness, which may be suitable for the initial calibration technique used to determine the baseline driving data 232 (e.g., some people hate round-a-bouts, others may be very comfortable and/or enjoy round-a-bouts). The updates to the parameters 460aa-460nn may be used to update the edge case parameters 238 in response to the driver intervention events. The updates to the parameters 460aa-460nn may be used to generate an updated version of the personal driving model 234.

Referring to FIG. 9, a method (or process) 500 is shown. The method 500 may implement auto-calibration for a personalized self-driving experience. The method 500 generally comprises a step (or state) 502, a step (or state) 504, a step (or state) 506, a step (or state) 508, a step (or state) 510, a decision step (or state) 512, a step (or state) 514, a step (or state) 516, a step (or state) 518, a step (or state) 520, a step (or state) 522, and a step (or state) 524.

The step 502 may start the method 500. In the step 504, the processor 102 may receive the baseline driving data of the driver 60. For example, the calibration system 202 may provide the baseline driving data, which may be stored in the baseline driving data 232 of the memory 150. Next, in the step 506, the processor 102 may initialize the programmable driving stack 220 for the vehicle 50 based on the baseline driving data 232. In the step 508, the autonomous driving system 214 of the vehicle 50 may operate the vehicle autonomously using the programmable driving stack 220. Next, in the step 510, the vehicle 50 and/or the autonomous driving system 214 may monitor for intervention events by the driver 60 while the camera systems 100a-100n capture pixel data of the environment 40. For example, the processor 102 may generate the video data 242 in response to the pixel data arranged as video frames while the vehicle 50 is in operation (e.g., whether being driven autonomously or manually). Next, the method 500 may move to the decision step 512.

In the decision step 512, the processor 102 may determine whether the driver 60 has intervened. For example, the vehicle 50 may generate the signal INTV in response to the driver 60 providing the input NAVIN to the manual vehicle controls 212 while the vehicle 50 is operating autonomously. If the driver 60 has not intervened, then the method 500 may return to the step 508 (e.g., the vehicle 50 may continue to operate autonomously). If the processor 102 detects that the driver 60 has intervened, then the method 500 may move to the step 514. In the step 514, the processor 102 may perform computer vision operations on the video frames to detect details of the environment 40 for the driver intervention event. Next, in the step 516, the processor 102 may receive the vehicle navigation input. For example, the processor 102 may receive the signal INTV from the vehicle 50. Next, the method 500 may move to the step 518.

In the step 518, the AI module 230 may perform video-to-text AI analysis to generate the text description of the driver intervention event, based on computer vision operations and/or vehicle navigation input. For example, the AI module 230 may implement video-to-text analysis and/or sensor-fusion-to-text analysis to generate the natural text description 454 of the driver intervention event 456. Next, in the step 520, the AI module 230 may generate the edge case parameters 238 in response to the natural text description 454 of the driver intervention event 456. In the step 522, the processor 102 may update the personalized driving model 234. For example, the processor 102 may update the personalized driving model 234 in response to the edge case parameters 238 and/or the baseline driving data 232. Next, in the step 524, the processor 102 may update the programmable driving stack 220 based on the personalized driving model 234. For example, the processor 102 may generate the signal PDM comprising update data from the personalized driving model 234. Next, the method 500 may return to the step 508 (e.g., the autonomous driving system 214 may continue to operate the vehicle 50 autonomously using the updated programmable driving stack 220).

Referring to FIG. 10, a method (or process) 550 is shown. The method 550 may generate baseline driving data using off-line calibration. The method 550 generally comprises a step (or state) 552, a step (or state) 554, a step (or state) 556, a step (or state) 558, a decision step (or state) 560, a step (or state) 562, a step (or state) 564, a step (or state) 566, a step (or state) 568, a step (or state) 570, and a step (or state) 572.

The step 552 may start the method 550. In the step 554, the calibration system 202 may provide an off-line calibration. For example, the driver 60 may use the calibration system 202 before ever driving the vehicle 50. Next, in the step 556, the calibration system 202 may present the driver 60 with a next one of the driving scenarios 210. For example, the driving scenarios 210 may comprise a number of common driving situations that may be encountered while driving. In the step 558, the calibration system 202 may display the virtual driving scenario and/or capture the driver input. For example, the driving scenarios 210 may be presented to the driver 60 using the headset 306 (e.g., via the signal VR-CAL) and the driver 60 may use the various vehicle inputs 312-322 to provide the input DRV-IN to the calibration system 202 in response to the particular driving scenario presented. The computing device 308 may capture and/or store the driver inputs corresponding to the various driving scenarios 210. Next, the method 550 may move to the decision step 560.

In the decision step 560, the calibration device 308 may determine whether there are more of the driving scenarios 210. If the driver 60 has not provided input for each of the driving scenarios 210, then the method 550 may return to the step 556. If the driver 60 has provided input for each of the driving scenarios 210, then the method 550 may move to the step 562. In the step 562, the calibration system 202 may communicate the captured driver input to the AI module 230. For example, the calibration system 202 may generate the signal BASE comprising the captured driver input corresponding to the driving scenarios 210. The interface 206 may receive the signal BASE, which may be provided to the AI module 230. Next, the method 550 may move to the step 564.

In the step 564, the AI module 230 may analyze the driver input in the signal BASE with respect to the driving scenarios 210. Next, in the step 566, the AI module 230 may determine the driver behavior preferences for the driving scenarios 210. In the step 568, the AI module 230 may generate the baseline driving data 232 in response to the driver behavior determined. For example, the baseline driving data 232 may be stored in the memory 150 corresponding to the driver profile of the driver 60. Next, in the step 570, the processor 102 may initialize the programmable driving stack 220 of the vehicle 50 using the baseline driving data 232. Next, the method 550 may move to the step 572. The step 572 may end the method 550.

Figure 11:
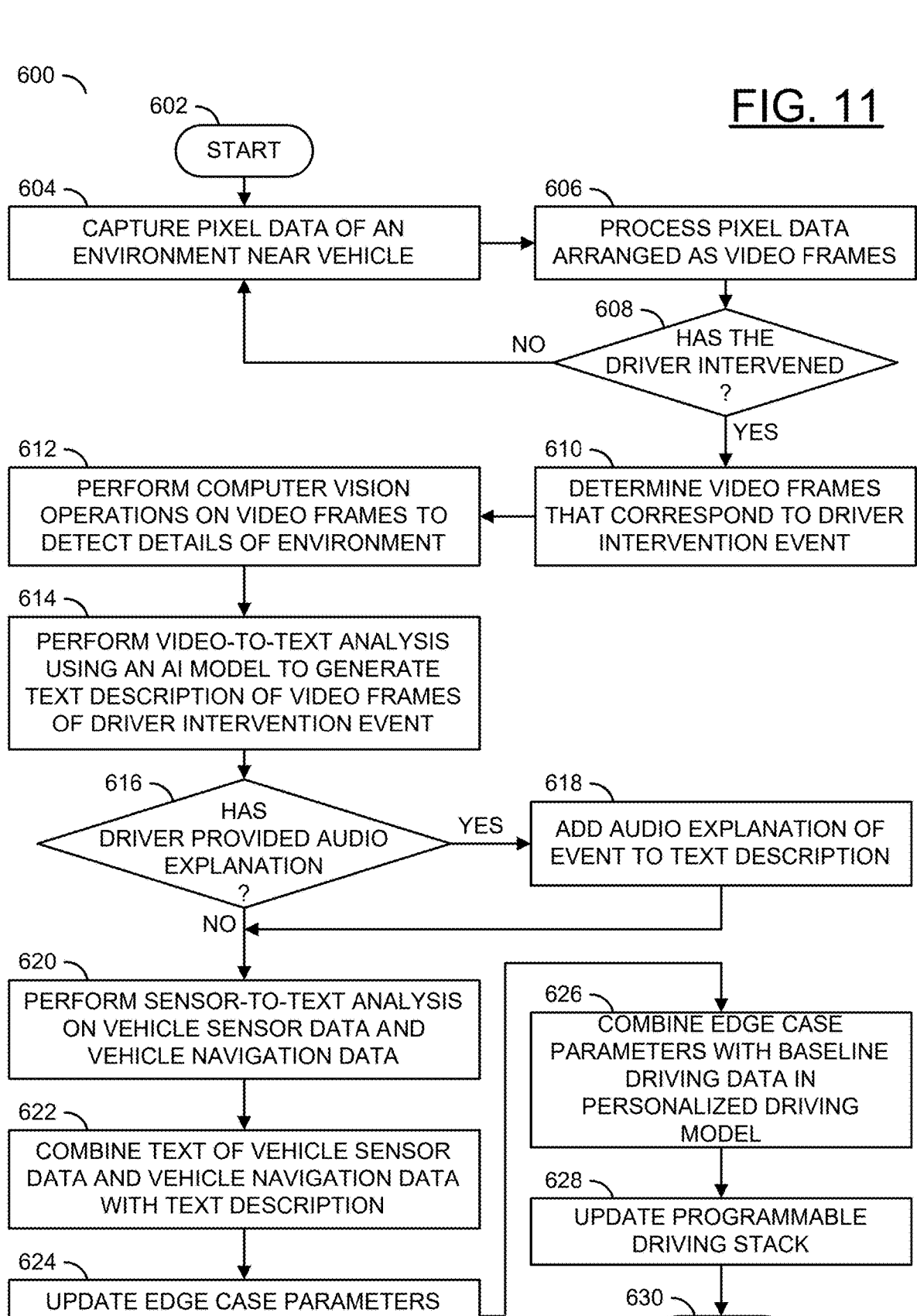
FIG. 11 is a flow diagram illustrating a method for updating a personalized driving model in response to a driver intervention event.

Referring to FIG. 11, a method (or process) 600 is shown. The method 600 may update a personalized driving model in response to a driver intervention event. The method 600 generally comprises a step (or state) 602, a step (or state) 604, a step (or state) 606, a decision step (or state) 608, a step (or state) 610, a step (or state) 612, a step (or state) 614, a decision step (or state) 616, a step (or state) 618, a step (or state) 620, a step (or state) 622, a step (or state) 624, a step (or state) 626, a step (or state) 628, and a step (or state) 630.

The step 602 may start the method 600. In the step 604, the capture devices 104a-104n may capture pixel data (e.g., the signals VID_A-VID_N) of the environment 40 near the vehicle 50. Next, in the step 606, the processor 102 may process the pixel data arranged as video frames. For example, the video processing pipeline 252 may generate the signal VDATA, which may be stored as the video data 242 and/or presented to the AI module 230. Next, the method 600 may move to the decision step 608.

In the decision step 608, the processor 102 may determine whether the driver 60 has intervened on the autonomous driving of the vehicle 50. For example, the processor 102 may receive the signal INTV when the vehicle 50 receives the navigation input (e.g., NAVIN) from the manual vehicle controls 212. If the driver 60 has not intervened, then the method 600 may return to the step 604. Generally, the processor 102 may continually generate the video data 242 while the vehicle 50 is in operation (e.g., whether there is a driver intervention event detected or not). If the driver 60 has intervened, then the method 600 may move to the step 610.

In the step 610, the processor 102 may determine which of the video frames 452a-452z correspond to the driver intervention event. For example, the timing data in the signal INTV may be used by the processor 102 to compare to the timestamps of the video frames in the video data 242 to determine which video frames correspond to the driver intervention event 456. Next, in the step 612, the video processing pipeline 252 may perform computer vision operations on the video frames to detect details of the environment 40. In the step 614, the video-to-text AI model 254 may perform video-to-text analysis to generate the natural text description 454 of the video frames 452j-452t of the driver intervention event 456. For example, the video-to-text AI model 254 may generate the signal TDESC, which may be stored as the intervention events 236. Next, the method 600 may move to the decision step 616.

In the decision step 616 the processor 102 may determine whether the driver 60 has provided an audio explanation of the driver intervention event. For example, the microphone 188c may capture the signal AUDIO that the processor 102 may compare to the timing of the timestamps of the video data 242. If the audio explanation has been provided, then the method 600 may move to the step 618. In the step 618, driving AI model 256 may add the audio explanation to the text description of the video frames. Next, the method 600 may move to the step 620. In the decision step 616, if the audio explanation has not been provided, then the method 600 may move to the step 620.

In the step 620, the driving AI model 256 may perform sensor-to-text analysis of the vehicle sensor data and/or the vehicle navigation data. For example, the signal INTV may comprise the driver navigation input (e.g., the signal NAVIN) and/or the vehicle sensor data input (e.g., the signal ENVSEN). Next, in the step 622, the driving AI model 256 may combine the text of the vehicle sensor data and/or the vehicle navigation data with the text description of the video frames. For example, the driving AI model 256 may generate the signal NAVDESC in response to the signal INTV and the signal TDESC and/or audio data. In the step 624, the driving AI model 230 may update the edge case parameters 238. Next, in the step 626, the processor 102 may combine the edge case parameters 238 with the baseline driving data 232 in the personalized driving model 234. In the step 628, the processor 102 may update the programmable driving stack 220. For example, the processor 102 may generate the signal PDM, which may be transmitted from the interface 206 to the programmable driving stack 220 of the vehicle 50. Next, the method 600 may move to the step 630. The step 630 may end the method 600.

Referring to FIG. 12, a method (or process) 650 is shown. The method 650 may constrain the personalized driving model based on safeguard boundaries. The method 650 generally comprises a step (or state) 652, a step (or state) 654, a step (or state) 656, a step (or state) 658, a step (or state) 660, a step (or state) 662, a step (or state) 664, a decision step (or state) 666, a step (or state) 668, a step (or state) 670, and a step (or state) 672.

The step 652 may start the method 650. In the step 654, the driving AI model 256 may analyze the text description 454 of the driver intervention event 456. Next, in the step 656, the driving AI model 256 may determine the level of criticality of the event. For example, the level of criticality may be determined in response to the objects detected in the video frames, the description of the event, the audio input provided by the driver 60 and/or the navigation input provided by the driver 60. In some embodiments, the level of criticality may be determined in response to a comparison of known critical events. For example, the driver 60 slamming the brakes may have a high level of criticality. In another example, the driver 60 casually commenting on the driving scenario may have a low level of criticality. The method of determining the level of criticality may be varied according to the design criteria of a particular implementation.

In the step 658, the driving AI model 256 may determine the weighting to apply to the driving behavior in response to the event based on the level of criticality of the event and/or the type(s) of the event. For example, the driving AI model 256 may determine how closely the determined driving intervention event corresponds to the parameters 460aa-460nn. Next, in the step 660, the driving AI model 256 may update the edge case parameters 238 based on the weighting for the type(s) of events detected. For example, the driving AI model 256 may generate the signals WA-WN to update one or more of the parameters 460aa-460nn. In the step 662, the processor 102 may determine the update for the personalized driving model 234 based on the updated edge case parameters 238. Next, in the step 664, the processor 102 may compare the behavior in the update to the personalized driving model 234 to the safeguards 240. Next, the method 650 may move to the decision step 666.

In the decision step 666, the processor 102 may determine whether the updates to the personalized driving model 234 are within the boundaries of the safeguards 240. If the updates are not within the boundaries of the safeguard data 240, then the method 650 may move to the step 668. In the step 668, the processor 102 may modify the updates to stay within the boundaries of the safeguards 240 (e.g., limit the amount of the modification by clipping the values of the weights to a particular boundary). Next, the method 650 may move to the step 670. In the decision step 666, if the updates to the personalized driving model 234 are within the boundaries of the safeguards 240, then the method 650 may move to the step 670. In the step 670, the processor 102 may update the personalized driving model 234. Next, the method 650 may move to the step 672. The step 672 may end the method 650.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive (i) baseline driving data of a driver, (ii) pixel data of an environment near a vehicle and (iii) vehicle navigation input from said driver; and a processor configured to (i) initialize a programmable driving stack for said vehicle in response to said baseline driving data of said driver, (ii) monitor for intervention events from said driver, (iii) determine edge case parameters for said driver in response to an analysis of said intervention events, (iv) generate a personalized driving model for said driver in response to (a) said baseline driving data and (b) said edge case parameters and (v) update said programmable driving stack using said personalized driving model, wherein (i) said analysis of said intervention events comprises said processor (a) processing said pixel data arranged as video frames, (b) performing computer vision operations on said video frames to detect details about said environment, (c) performing video-to-text analysis of said video frames to generate a text description of said details about said environment, and (d) adding said vehicle navigation input to said text description, and (ii) said processor comprises an AI model configured to (a) generate said edge case parameters in response to said text description and (b) update said personalized driving model in response to said edge case parameters.

2. The apparatus according to claim 1, wherein said programmable driving stack enables an autonomous driving system of said vehicle to operate according to said personalized driving model of said driver.

3. The apparatus according to claim 1, wherein said AI model is a Large Language and Vision Assistant (LlaVA) configured to perform said video-to-text analysis.

4. The apparatus according to claim 1, wherein (i) said interface is further configured to capture audio, (ii) said audio comprises a description of said vehicle navigation input by said driver in response to said intervention events, (iii) said AI model is a Large Language Model (LLM) configured to interpret said audio and (iv) said edge case parameters are further determined in response to said audio.

5. The apparatus according to claim 1, wherein said edge case parameters for said personalized driving model for said driver are constrained by a safeguard calibration range.

6. The apparatus according to claim 5, wherein said safeguard calibration range comprises rules and regulations for driving said vehicle.

7. The apparatus according to claim 5, wherein said safeguard calibration range comprises safety limitations on operation of said vehicle.

8. The apparatus according to claim 1, wherein said personalized driving model is configured to tune an autonomous driving system of said vehicle to driving habits of said driver.

9. The apparatus according to claim 1, wherein said personalized driving model comprises a set of variable weights and biases compatible with said programmable driving stack of said vehicle.

10. The apparatus according to claim 1, wherein said baseline driving data of said driver is generated by a calibration system that operates separate from said vehicle.

11. The apparatus according to claim 10, wherein said calibration system is configured to (i) present said driver with a plurality of common driving scenarios (ii) capture driver input to said calibration system, (iii) determine driver behavior in response to said driver input based on said plurality of common driving scenarios and (iv) generate said baseline driving data of said driver in response to said driver behavior.

12. The apparatus according to claim 11, wherein said plurality of common driving scenarios comprise one or more of lane merging, merging onto a highway, merging onto a highway off ramp, unprotected left-turns, and passing other vehicles.

13. The apparatus according to claim 10, wherein said calibration system is configured to generate a virtual driving experience for said driver.

14. The apparatus according to claim 13, wherein (i) said virtual driving experience is enabled using a virtual reality headset, (ii) said calibration system comprises a vehicle seat, a steering wheel, an acceleration pedal, and vehicle controls, and (iii) said baseline driving data of said driver is captured from said steering wheel, said acceleration pedal and said vehicle controls.

15. The apparatus according to claim 1, wherein (i) said AI model is configured to determine a level of criticality of said intervention events and (ii) determine a weighting of updates to said edge case parameters in response to said level of criticality of said intervention events.

16. The apparatus according to claim 1, wherein (i) said AI model is configured to determine one or more driving scenario parameters that correspond to said intervention events and (ii) update said edge case parameters in response to said one or more driving scenario parameters that correspond to said intervention events.

17. The apparatus according to claim 16, wherein (i) said AI model is configured to determine a level of precision that said one or more driving scenario parameters matches said intervention events and (ii) a weighting of an update for said one or more driving scenario parameters corresponds to said level of precision.

18. The apparatus according to claim 1, wherein said analysis of said intervention events is configured to determine driver behavior for edge case driving scenarios not included in said baseline driving data.

19. A system comprising:
a calibration system configured to capture baseline driving data of a driver;
a vehicle configured to (i) capture vehicle navigation input from said driver and (ii) operate autonomously in response to a programmable driving stack;
a capture device configured to generate pixel data of an environment near said vehicle; and
a processor configured to (i) initialize said programmable driving stack for said vehicle in response to said baseline driving data of said driver, (ii) monitor for intervention events from said driver, (iii) determine edge case parameters for said driver in response to an analysis of said intervention events, (iv) generate a personalized driving model for said driver in response to (a) said baseline driving data and (b) said edge case parameters and (v) update said programmable driving stack using said personalized driving model, wherein
(i) said calibration system operates separate from said vehicle,
(ii) said analysis of said intervention events comprises said processor (a) processing said pixel data arranged as video frames, (b) performing computer vision operations on said video frames to detect details about said environment, (c) performing video-to-text analysis of said video frames to generate a text description of said details about said environment, and (d) adding said vehicle navigation input to said text description, and
(iii) said processor comprises an AI model configured to (a) generate said edge case parameters in response to said text description and (b) update said personalized driving model in response to said edge case parameters.

20. An apparatus comprising:
a memory configured to store (i) baseline driving data of a driver, (ii) a personalized driving model of said driver, (iii) pixel data arranged as video frames and (iv) processor executable instructions; and
a processor configured to execute said processor executable instructions, wherein
(i) said processor executable instructions are configured to
initialize a programmable driving stack for a vehicle in response to said baseline driving data of said driver,
monitor for intervention events from said driver,
determine edge case parameters for said driver in response to an analysis of said intervention events,
process said pixel data arranged as video frames,
perform computer vision operations on said video frames to detect details about an environment near said vehicle,
perform video-to-text analysis of said video frames to generate a text description of said details about said environment,
add vehicle navigation input to said text description,
generate said personalized driving model for said driver in response to (a) said baseline driving data and (b) said edge case parameters, and
update said programmable driving stack using said personalized driving model, and
(ii) said processor comprises an AI model configured to (a) generate said edge case parameters in response to said text description and (b) update said personalized driving model in response to said edge case parameters.

* * * * *